(12) United States Patent
Crager

(10) Patent No.: US 9,569,451 B1
(45) Date of Patent: Feb. 14, 2017

(54) FOLDER CREATION APPLICATION

(71) Applicant: Crowdshifter, LLC, Papillion, NE (US)

(72) Inventor: Jamie L. Crager, Papillion, NE (US)

(73) Assignee: Crowdshifter, LLC, Papillion, NE (US)

( * ) Notice: Subject to any disclaimer, the term of this patent is extended or adjusted under 35 U.S.C. 154(b) by 874 days.

(21) Appl. No.: 13/886,667

(22) Filed: May 3, 2013

Related U.S. Application Data

(60) Provisional application No. 61/641,971, filed on May 3, 2012.

(51) Int. Cl.
*G06F 7/00* (2006.01)
*G06F 17/30* (2006.01)
*G06Q 50/00* (2012.01)

(52) U.S. Cl.
CPC ......... *G06F 17/30115* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2012/0239479 A1* | 9/2012 | Amaro | G06Q 20/102 705/14.23 |
| 2012/0304087 A1* | 11/2012 | Walkin | G06F 17/30241 715/764 |
| 2013/0066964 A1* | 3/2013 | Odio | G06Q 50/01 709/204 |

* cited by examiner

*Primary Examiner* — Jau-Shya Meng
(74) *Attorney, Agent, or Firm* — Tyson B. Benson; Advent, LLP

(57) ABSTRACT

The present disclosure is directed to a system and a method to facilitate the creation of folders that may include a variety of content based upon a check-in at an event. In one or more implementations, a server may be configured to create one or more folders automatically when a user checks into an event via a mobile electronic device. The server is also configured to cause at least one tag to be associated with the folder to define the event. The server can also receive content from the mobile electronic device. Upon receiving the content, the content is associated with the folder.

13 Claims, 20 Drawing Sheets

Date (day, month, year) 108A

Location (GPS & WiFi) (Pre loaded)    108B

Business, Event, Brand (Preloaded)    108C

All People/Content in above location    108E

Your Folder  108H

Other Folders  108I

Other Content  108J
- Event Content
- Booth Content
- Sub Folder Sponsorship

FOLDER CREATION APPLICATION

CROSS-REFERENCE TO RELATED APPLICATIONS

The present application claims the benefit under 35 U.S.C. §119(e) of U.S. Provisional Application Ser. No. 61/641,971, entitled FOLDER CREATION APPLICATION, filed on May 3, 2012, which is herein incorporated by reference in its entirety.

BACKGROUND

Application software ("an app") is computer software designed to assist a user in performing one or more specific tasks. In implementations, application software includes, but is not limited to: enterprise software, mobile application software, graphics software, media players, or the like.

SUMMARY

Techniques are described that facilitate the creation of folders that may include a variety of content based upon a check-in at an event. In one or more implementations, a server may be configured to create one or more folders automatically when a user checks into an event via a mobile electronic device. The server is also configured to cause at least one tag to be associated with the folder to define the event. The server can also receive content from the mobile electronic device. Upon receiving the content, the content is associated with the folder.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Tags are a type of meta-information (e.g., metadata) that describe some aspect of content such as a photograph, an email, a video, a document, and so forth. The use of tags has gained wide popularity due to the growth of social networking, photography sharing, and bookmarking websites. These websites allow users to create and manage tags that categorize content using keywords. Increasingly, tags may include more information than traditional non-hierarchical keywords or terms. For example, tags may capture knowledge in the form of descriptions, categorizations, relationships, classifications, semantics, comments, notes, annotations, hyperlinks, or references. Tags may be combined into tag profiles that reference the content resources that reside in distributed storage repositories.

Accordingly, techniques are described that facilitate the creation of folders that may include a variety of content based upon a check-in at an event. In one or more implementations, a server may be configured to create one or more folders automatically when a user checks into an event via a mobile electronic device. The server is also configured to cause at least one tag to be associated with the folder to define the event. The server can also receive content from the mobile electronic device. Upon receiving the content, the content is associated with the folder.

Example Environment

Figure 1:
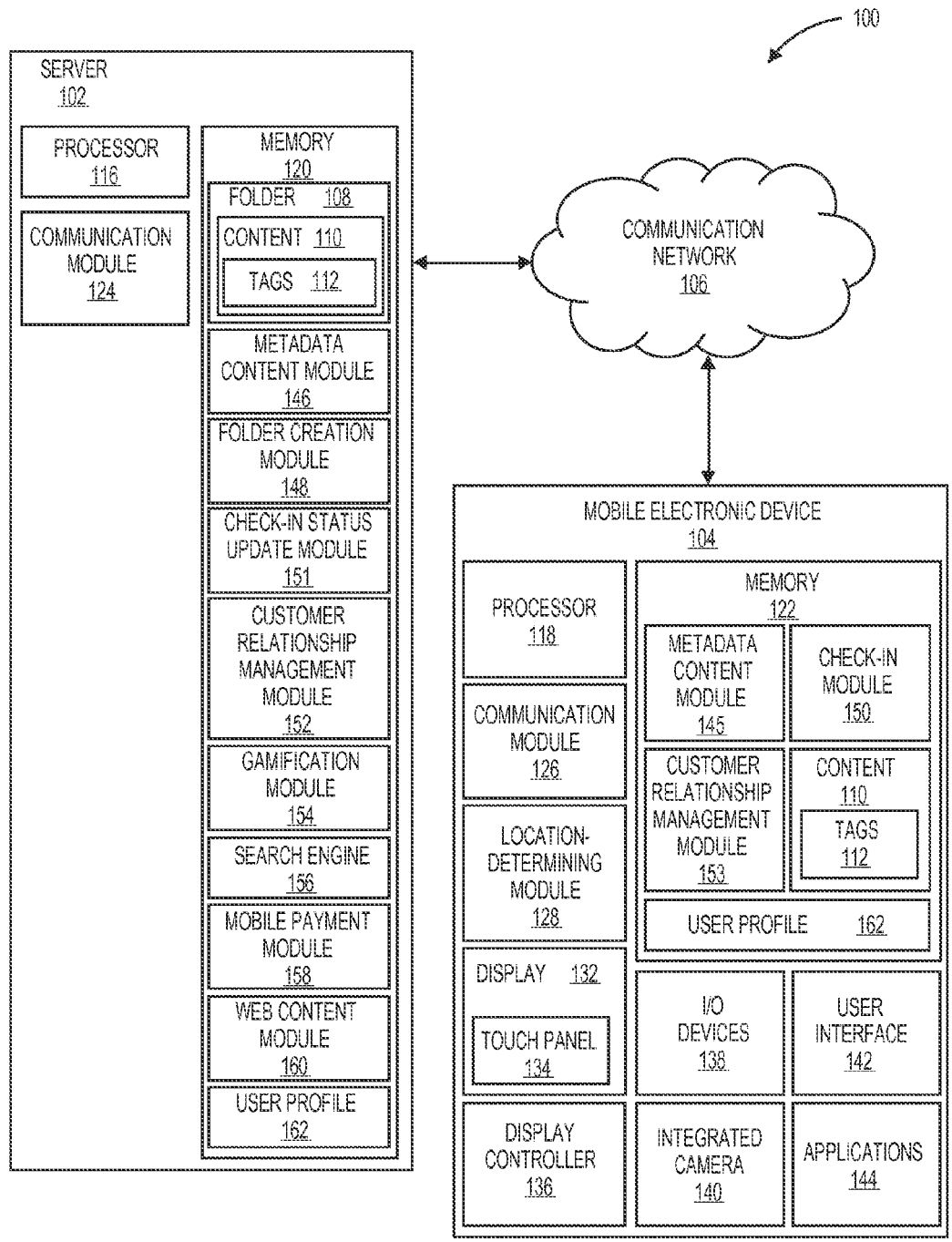
FIG. 1 is an illustration of an environment in an example implementation that includes a server operable to create one or more folders based upon a defined relationship associated with the content.

FIG. 1 illustrates an environment 100 in an example implementation that is operable to facilitate the automatic creation of relationship-based folders in accordance with the present disclosure. The illustrated environment 100 includes a server 102 and a mobile electronic device 104 that communicates with the server 102 via one or more networks 106. The server 102 includes one or more folders 108 that are created based upon the digital content 110 furnished by and/or generated by the mobile electronic device 104. Each folder 108 may include content 110 based upon metadata, such as one or more tags 112, associated with (e.g., included in) the content 110. In an implementation, content 110 is organized within a folder 108 based upon a relationship defined by the metadata (e.g., tags 112). For example, and as described in greater detail below, a first folder 108 may include, or categorize, content 110 associated with a first relationship, a second folder may include content associated with a second relationship, and so forth.

The server 102 may be configured in a variety of ways. For example, the server 102 may be configured as one or more server computers that are capable of communicating over a wired or wireless network 106. The mobile electronic device 104 may also be configured in a variety of ways. For example, the mobile electronic device 104 may be configured as a mobile phone (e.g., a smart phone, a cell phone, etc.), a portable computing device, and so forth, that is capable of communicating over a wireless network. Additionally, although one mobile electronic device 104 is illustrated, it is understood that the server 102 may provide the functionality described herein to multiple mobile electronic devices 104.

The network 106 may assume a wide variety of configurations. For example, the network 106 may comprise any of a plurality of communications standards, protocols and technologies, including, but not limited to: a 3G communications network, a 4G communications network, a Global System for Mobile Communications (GSM) environment, an Enhanced Data GSM Environment (EDGE) network, a high-speed downlink packet access (HSDPA) network, a wideband code division multiple access (W-CDMA) network, a code division multiple access (CDMA) network, a time division multiple access (TDMA) network, Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)) environment, an instant messaging (e.g., extensible messaging and presence protocol (XMPP) environment, Session Initiation Protocol for Instant Messaging and Presence Leveraging Extensions (SIMPLE), and/or Instant Messaging and Presence Service (IMPS), and/or Short Message Service (SMS)), or any other suitable communication protocol, that facilitates communication between the server 102 and the mobile electronic device 104.

In FIG. 1, the server 102 and the mobile electronic device 104 are illustrated as including a respective processor 116 or 118; a respective memory 120 or 122; and a respective communication module 124 or 126. In the following discussion, elements of the server 102 are described with reference to FIG. 1. Respective elements and/or reference numbers related to the mobile electronic device 104 are shown in parentheses. Where appropriate, elements of the mobile electronic device 104 are described separately.

The processor 116 (118) provides processing functionality for the server 102 (mobile electronic device 104) and may include any number of processors, micro-controllers, or other processing systems, and resident or external memory for storing data and other information accessed or generated by the server 102 (mobile electronic device 104). The processor 116 (118) may execute one or more software programs which implement techniques described herein. The processor 116 (118) is not limited by the materials from which it is formed or the processing mechanisms employed therein and, as such, may be implemented via semiconductor (s) and/or transistors (e.g., electronic integrated circuits (ICs)), and so forth.

The memory 120 (122) is an example of tangible computer-readable media that provides storage functionality to store various data associated with the operation of the server 102 (mobile electronic device 104), such as the software program and code segments mentioned above, or other data to instruct the processor 116 (118) and other elements of the server 102 (mobile electronic device 104) to perform the steps described herein. Although a single memory 120 (122) is shown, a wide variety of types and combinations of memory may be employed. The memory 120 (122) may be integral with the processor 116 (118), stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

The communication module 124 (126) provides functionality to enable the server 102 (mobile electronic device 104) to communicate with one or more networks (depicted in FIG. 1 as network 106). In various implementations, the communication module 124 (126) may be representative of a variety of communication components and functionality including, but not limited to: one or more antennas; a browser; a transmitter and/or receiver (e.g., radio frequency circuitry); a wireless radio; data ports; software interfaces and drivers; networking interfaces; data processing components; and so forth.

The mobile electronic device 104 further includes a location-determining module 128 configured to provide location-determining functionality for the mobile electronic device 104. For instance, location-determining functionality may be employed to provide approximate location data of the device 104. In implementations, the location-determining module 128 may comprise a receiver that is configured to receive signals from one or more position-transmitting sources. In embodiments, the location-determining module 128 may be a global positioning system (GPS) receiver operable to receive navigational signals from GPS satellites and to calculate the approximate location of the mobile electronic device 104 as a function of the signals.

The one or more networks 106 may be representative of a variety of different communication pathways and network connections which may be employed, individually or in combinations, to communicate among the components of the environment 100. Thus, the one or more networks 106 may be representative of communication pathways achieved using a single network or multiple networks. Further, the one or more networks 106 are representative of a variety of different types of networks and connections that are contemplated, including, but not limited to: the Internet; an intranet; a satellite network; a cellular network; a mobile data network; wired and/or wireless connections; and so forth.

Examples of wireless networks include, but are not limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

As shown in FIG. 1, the mobile electronic device 104 includes a touch-sensitive display 132, which can be implemented using a liquid crystal display, an organic light emitting diode display, or the like. In some embodiments, the touch-sensitive display 132 may include a touch panel 134. The touch panel 134 may be, but is not limited to: a capacitive touch panel, a resistive touch panel, an infrared touch panel, combinations thereof, and the like. Thus, the display 132 may be configured to receive input from a user and display information to the user of the mobile electronic device 104. For example, the display 132 displays visual output to the user. The visual output may include graphics, text, icons, video, interactive fields configured to receive input from a user, and any combination thereof (collectively termed "graphics"). In some embodiments, some or all of the visual output may correspond to user-interface objects, further details of which are described below.

The display 132 is communicatively coupled to a display controller 136 that is configured to receive and/or transmit electrical signals to the touch-sensitive display 132. In an implementation, the touch panel 134 includes a sensor, an array of sensors, or the like, configured to accept input from a user based upon haptic and/or tactile contact. The touch panel 134, in combination with the display controller 136 (along with any associated modules and/or sets of computer-readable instructions in memory 122), detects a point of contact (or points of contact), as well as any movement or breaking of the contact, on the touch panel 134 and converts the detected contact (e.g., a finger of the user, a stylus, etc.) into electrical signals representing interactions with user-interface objects (e.g., buttons, custom views, icons, web pages, images, web page links, etc.) that are displayed through the display 132. The mobile electronic device 104 may further include one or more input/output (I/O) devices 138 (e.g., a keypad, buttons, a wireless input device, a thumbwheel input device, a trackstick input device, and so on). The I/O devices 138 may include one or more audio I/O devices, such as a microphone, speakers, and so on. Thus, I/O devices 138 may include a keyboard configured to receive user input. In an implementation, the keyboard may be integrated with the mobile electronic device 104, or the keyboard may be a peripheral device that is configured to interface with the device 104 (e.g., via a USB port, etc.)

The mobile electronic device 104 of FIG. 1 may be provided with an integrated camera 140 that is configured to capture content such as still photographs and/or video by digitally recording images using an electronic image sensor. Content captured by the camera 140 may be stored as digital image files in memory 122. In embodiments, the digital image files may be stored using a variety of file formats. For example, digital photographs may be stored using a Joint Photography Experts Group standard (JPEG) file format. Other digital image file formats include Tagged Image File Format (TIFF), Raw data formats, and so on. Digital video may be stored using a Motion Picture Experts Group (MPEG) file format, an Audio Video Interleave (AVI) file format, a Digital Video (DV) file format, a Windows Media Video (WMV) format, and so forth. Exchangeable image file format (Exif) data may be included with digital image files to provide metadata about the image media. For example, Exif data may include the date and time the image content was captured, the location where the content was captured, and the like. Digital image content may be displayed by display 132 and/or transmitted to other devices via the one or more networks 106 (e.g., via an email or MMS text message).

The mobile electronic device 104 is illustrated as including a user interface 142, which is storable in memory 122 and executable by the processor 118. The user interface 142 is representative of functionality to control the display of information and data to the user of the mobile electronic device 104 via the display 132. In some implementations, the display 132 may not be integrated into the mobile electronic device and may instead be connected externally using universal serial bus (USB), Ethernet, serial connections, and so forth. The user interface 142 may provide functionality to allow the user to interact with one or more applications 144 of the mobile electronic device 104 by providing inputs via the touch panel 134 and/or the I/O devices 138. For example, the user interface 142 may cause an application programming interface (API) to be generated to furnish functionality to an application 144 to configure the application for display by the display 132 or in combination with another display. In embodiments, the API may further furnish functionality to configure the application 144 to allow the user to interact with an application by providing inputs via the touch panel 134 and/or the I/O devices 138.

Applications 144 may comprise software, which is storable in memory 122 and executable by the processor 118, to perform a specific operation or group of operations to furnish specified functionality to the mobile electronic device 104. Example applications may include content resource management applications, cellular telephone applications, instant messaging applications, email applications, address book applications, and so forth.

In FIG. 1, the mobile electronic device 104 is illustrated as including a metadata content module 145, which may be implemented as a software application stored in memory 122 and executed by the processor 118 of the mobile electronic device 104. The metadata content module 145 is representative of functionality that allows the mobile electronic device 104 to add metadata to the content 110. In an implementation, the module 145 is configured to cause the mobile electronic device 104 to generate and/or assign one or more metadata tags 112 to content 110 accessed and/or generated by the mobile electronic device 104.

The server 102 may also be provided with a metadata content module 146, which may be implemented as a software application stored in memory 120 and executed by the processor 116. The metadata content module 146 is representative of functionality that allows the server 102, either alone, or in combination with the functionality provided by the metadata content module 145 of the mobile electronic device 104 to associate metadata (tags 112) with the content 110, which are utilized to define the relationship of the content 110 for categorization purposes. In embodiments, the tags 112 assigned by the metadata content module 145 (146) are metadata that describe and/or define a relationship aspect, as more fully described below, of the content 110 in some manner that is utilized to categorize the content 110. The metadata (e.g., tags 110) may define the relationships in the form of descriptions, categorizations, classifications, semantics, comments, notes, annotations, hyperlinks, references, and so on.

The content 110 may be categorized based upon one or more folder 108 structures (e.g., associated with one or more folders 108). The folders 108 are organized based upon a defined relationship (e.g., relationship parameters defined within the tags 112, etc.). For example, content 110 having a first relationship may be organized within a first folder 108. In another example, content 110 having a second relationship may be organized within a second folder 108. In yet another example, the folders 108 may be organized as a subset of one or more additional folders 108 (e.g., a subset of folders 108 share a common relationship with a superset of folders 108). For instance, the subset of folders 108 may organize content 110 having a defined relationship (within the tags 112) that is shared among the superset of folders 108 (e.g., a subset of content 110 shares a common tag with a superset of content 110 organized within the superset of folders 108). In an implementation, the folders 108 are stored on the server 102. The content 110 may also be stored in the respective memory 120, 122 of the server 102 and/or the mobile electronic device 104. It is contemplated that the relationship may be associated with one or more events. For example, the events may be, but are not limited to: a person, a group of people, a brand, a product, a business, a business meeting, a conference, a concert, a sporting event, a camping trip, prom, homecoming, a combination thereof, or the like, which is described in greater detail below with respect to the check-in module.

The modules 145, 146 are configured to add metadata to a variety of different types of content 110. In an implementation, the modules 145, 146 are configured to include tags 112 with the respective content 110. As described above, one or more tags 112 may be included with content 110 to define the relationship parameters of the content 110. In embodiments, content 110 can include, but is not limited to: user-created content such as photos, emails, SMS, MMS, videos, voice mail, phone calls, voice memos, contact information, and so on; external content such as news, weather, and so on; media content such as music information (e.g., title and artist information), video information (e.g., title and artist information), web sites accessed, posted web content; and so forth. Thus, at least a portion of the content 110 generated and/or furnished by the device 104 includes a tag 112 that defines at least one relationship parameter to allow for categorization of the content 110 within an appropriate folder 108 (or folders 108).

The metadata content module 145 (146) may be configured to furnish functionality to allow content to be supplied, or furnished, with metadata. For example, the user may cause a tag 112 to be applied to content 110 manually using the display 132, touch panel 134, and/or an I/O device 138, and so forth. In embodiments, the metadata content module 145 (146) may cause the user of the mobile electronic device 104 to be prompted (e.g., user may define relationship through textual input, user may define relationship through a drop-down menu, etc.) to define a relationship for a tag 112 to be applied to content 110. For example, the metadata content module 145 of a mobile electronic device 104 may cause the processor 118 to initiate a prompt to be displayed by the display 132 to allow the user to define a relationship (e.g., create a tag 112) of a photograph and/or video captured by the camera 140. In another example, the metadata content module 145 may cause the processor 118 to initiate a prompt to be displayed by the display 132 to allow the user to define a relationship of an e-mail within an e-mail client residing on the device 104 (e.g., an e-mail application 144). In another example, the metadata content module 145 may cause the processor 118 to initiate a prompt to be displayed by the display 132 to allow the user to define a relationship of an audio recording of a phone conference between multiple participates. In another example, the metadata content module 145 may cause the processor 118 to initiate a prompt to be displayed by the display 132 to allow the user to define a relationship of a document representing minutes from (e.g., recorded representation of events that transpired within) an executive meeting. It is understood that other examples are possible.

Figure 3A:
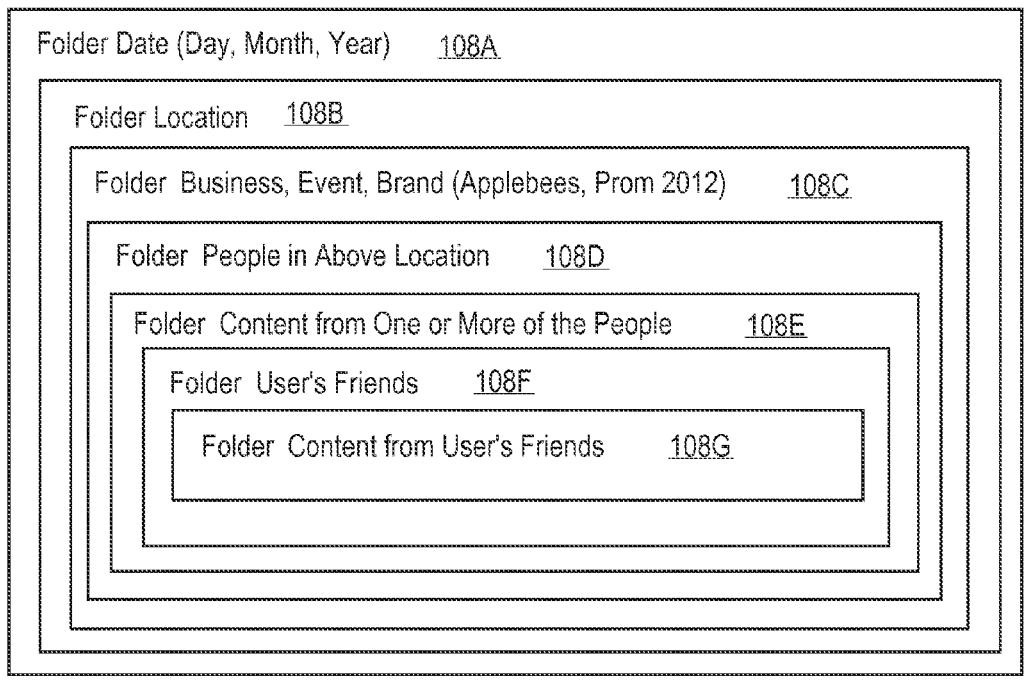
FIGS. 3A and 3B are conceptual illustrations of folder structures (i.e., a folder hierarchy) in accordance with an example implementation of the present disclosure.
Figure 3B:
Figure 3B:

The server 102 is further illustrated as including a folder creation module 148, which may be implemented as a software application stored in memory 120 and executed by the processor 116 of the server 102. The folder creation module 148 is representative of functionality implemented in the server 102 that facilitates the creation of one or more folders 108 based upon a relationship and/or a context of the content 110 as defined by the tags 112. In an implementation, the folder creation module 148 is configured to cause the processor 116 to create a folder 108 indicative of the relationship to the content 110. Once the folder 108 is created, the module 148 is configured to cause the content 110 to be associated with the folder 108. The folder creation module 148 may, for example, facilitate the automatic creation of folders 108 that include content 110 resident within the memory 122 of the mobile electronic device 104 (e.g., photographs, videos, business contact information, text files, etc.). Thus, the folder creation module 148 is configured to cause the processor 116 to organize content 110 based upon the defined relationship within the proper subsets of folders (see FIGS. 3A and 3B). As shown in FIGS. 3A and 3B, a first folder 108A includes content 110 having a relationship based upon a date. A second folder 108B includes content 110 having a relationship based upon a location, as well as the date. A third folder 108C includes content 110 having a relationship based upon a business (or event), the location, and the date, and so forth (e.g., a fourth folder 108D including content 110 having a relationship with people at the location, a fifth folder 108E that includes the content meeting the relationship requirements described above, etc.). It is understood that other examples are possible. Moreover, the user may manually create one or more folders 108 utilizing the folder creation module 148 (e.g., accessing the sub-routine available on the server 102 via the device 104). For example, the user may manually create a folder 108 based upon an event not previously created by the module 148 and manually direct content 110 to the manually created folder 108. It is understood that one or more folders 108 may be associated with a single user profile (i.e., profile 162). However, the user may share the folders 108 associated with the user's profile with other users (e.g., user can provide access to other individuals to allow the other individual to access the user's content 110). FIG. 3B illustrates another implementation of a folder 108 structure. For example, folder 108E may further include discrete folders 108H, 108I, 108J. For instance, folder 108H may include content 110 related to the user that checked into the event, and the folder 108I may include content 110 related to other users that checked into the event. Folder 108J may include content 110 that is related to general event information, booth information, folder sponsorship, and the like.

Figure 2A:
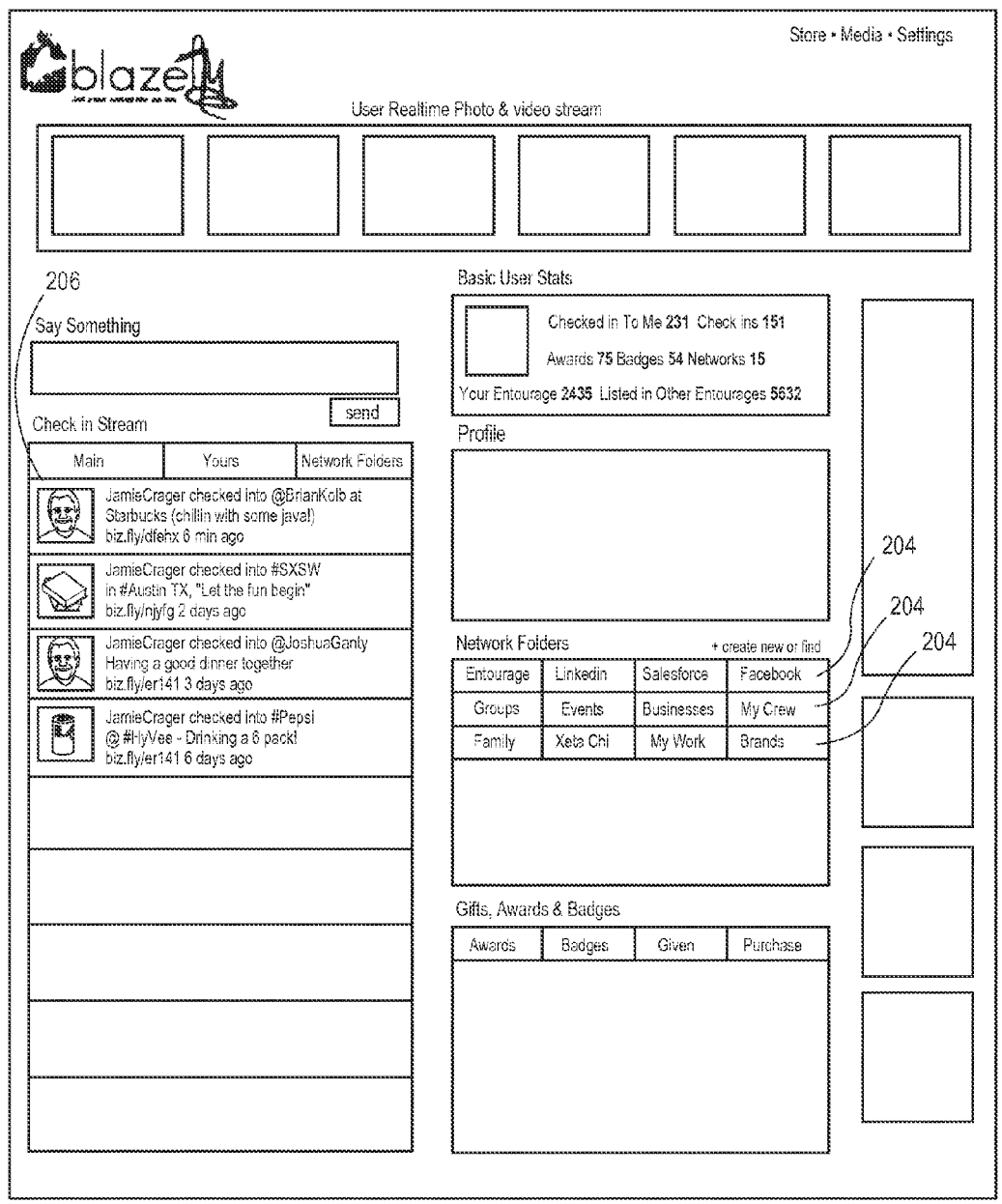
FIG. 2A illustrates an example screen shot in accordance with example implementations of the present disclosure.
Figure 2B:
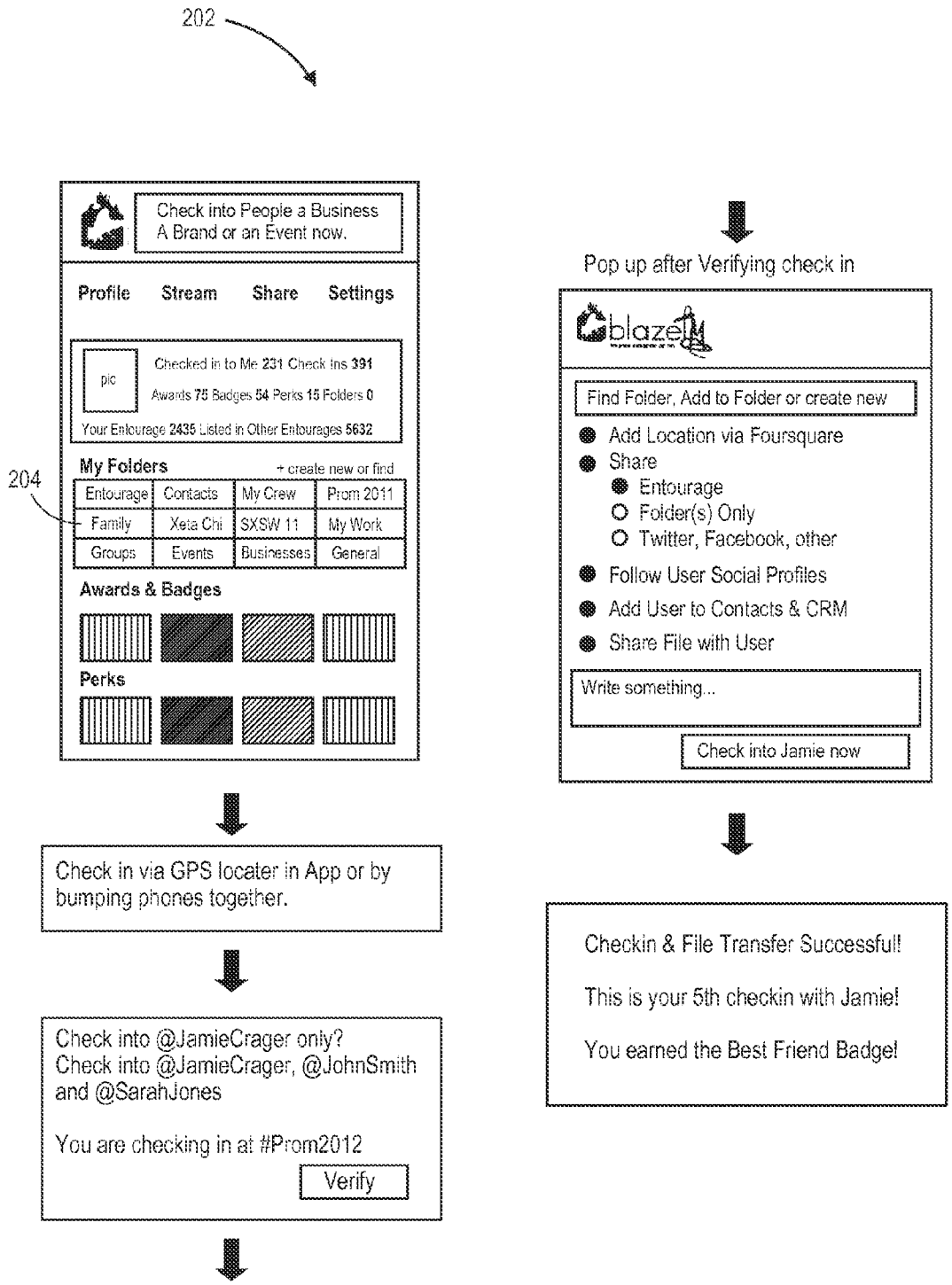
FIG. 2B illustrates example screen shots and an example flow chart in accordance with example implementations of the present disclosure.

As shown in FIG. 1, the mobile electronic device 104 also includes a check-in module 150 (e.g., relationship definition module), which may be implemented as a software application stored in memory 122 and executed by the processor 118 of the mobile electronic device 104. The check-in module 150 is representative of functionality configured to define one or more relationships for the content 110 based upon an event. In an implementation, a user of the device 104 can define a relationship, or "check-in," based upon a near contemporaneous situation and/or an event the user is involved with utilizing the module 150. As described above, an event may be a person, a brand, a business, a business meeting, a conference, an event (i.e., a planned public or social occasion), a combination thereof, or the like, in which the user is associated with the event (e.g., person the user just met, user is attending a conference, user is in a board meeting, etc.). In an implementation, the module 150 is configured to automatically check into events. For instance, the module 150 may be configured to automatically check into people (i.e., a person's profile, an event (e.g., business meeting, sporting event, wedding), locations, brands, and businesses at the same time, which generates tags and folders along with the content at substantially the same time. For example, a user may initiate the module 150 by interfacing with a graphic representing the module 150 via a touch input furnished over the touch panel 134, or the like. Upon initiating the module 150, the module 150 is configured to cause the processor 118 to display one or more graphics (e.g., text input fields, radio buttons, drop-down menus, etc.) to allow a user to define one or more relationships based upon a user's circumstances (e.g., or event the user is involved with). FIGS. 2A and 2B illustrate example screenshots 200, 202 that may be displayed by the display 132. As shown in FIG. 2A, the screenshot 200 includes graphics 204 representing access to the user's folders (as well as FIG. 2B), graphics 206 representing the user's check-in stream, and so forth. The check-in stream may comprise text-based messages, video-based messages, audio-based messages, or the like (e.g., user status updates) conveying check-in related information. For example, the check-in stream is representative of near-realtime access to various subsets of the user's check-ins (e.g., near-realtime access to various subsets of relationships defined by the user via the module 150). In one or more implementations, a check-in status update module 151 is configured to furnish the data to the mobile electronic device 104 such that the device 104 can display the graphics 204, 206 at the display 132.

The relationships may include, but are not limited to: one or more other persons, one or more events, one or more businesses, one or more brands, or the like. For example, the user may check-in to (define a relationship based upon) a phone call between the user and another participant. In another example, the user may check-in to a person the user met while at an event (e.g., business meeting, sporting event, technical conference, etc.). For instance, the user may check-in to the South by Southwest (SXSW) conference. In another instance, the user may check-in to a political event, such as a political candidate meet-and-greet, a political candidate phone conference, a caucus, or the like. In yet another example, the user may check-in to PEPSI, LEVI'S, or the like. It is contemplated that when a user checks into a brand, the user agrees to be contacted by the brand to receive discounts, updates, or the like. In yet another example, the user may check-in to "Prom 2012" (see FIG. 2B). It is contemplated that the user can check-in to multiple events. For instance, the user may utilize the check-in module to check-in to at least substantially instantaneously and/or automatically a person, a brand, an event, and a location during the same check-in (e.g., defines multiple relationships at least substantially instantaneously and/or automatically within the tags 112 to various events). Again, the user can allow access to the user's folders 108 across other networks and platforms (e.g., allow access to the folders 108 to various users).

Figure 7A:
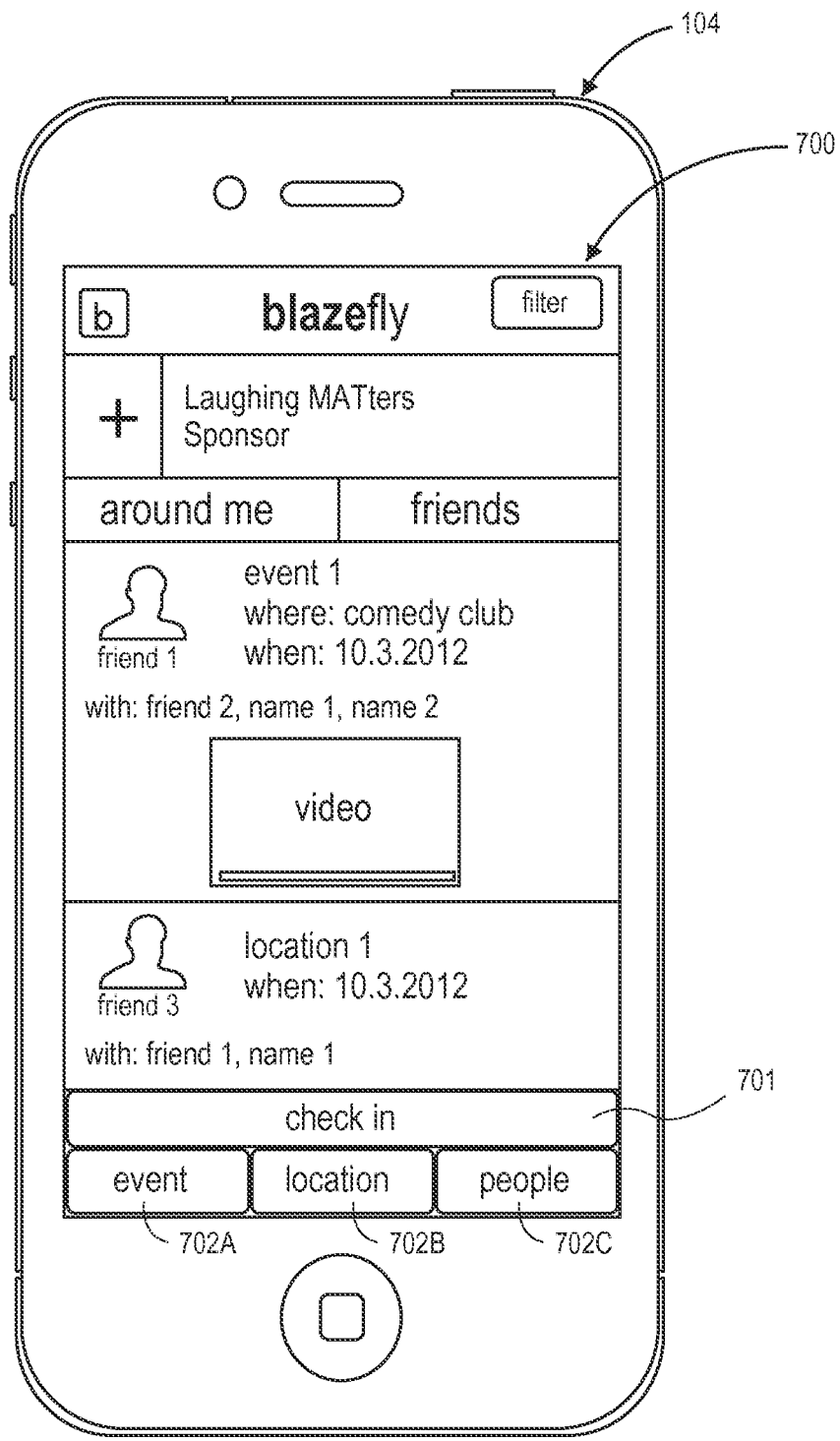
FIGS. 7A through 7K illustrate example displays at an electronic device in accordance with example implementations of the present disclosure, where the display represents example event check-in and folder creation screens.
Figure 7B:
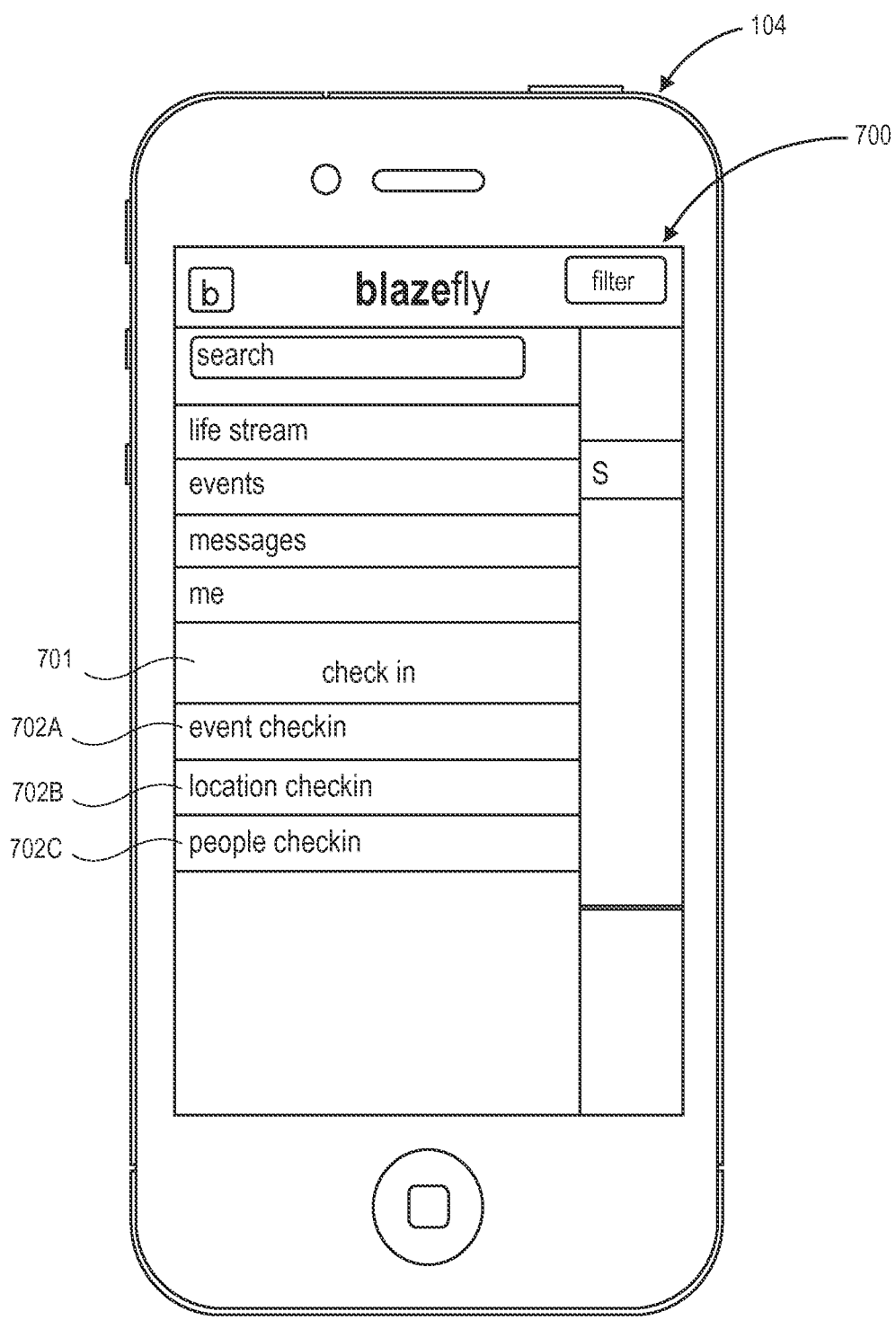
Figure 7C:
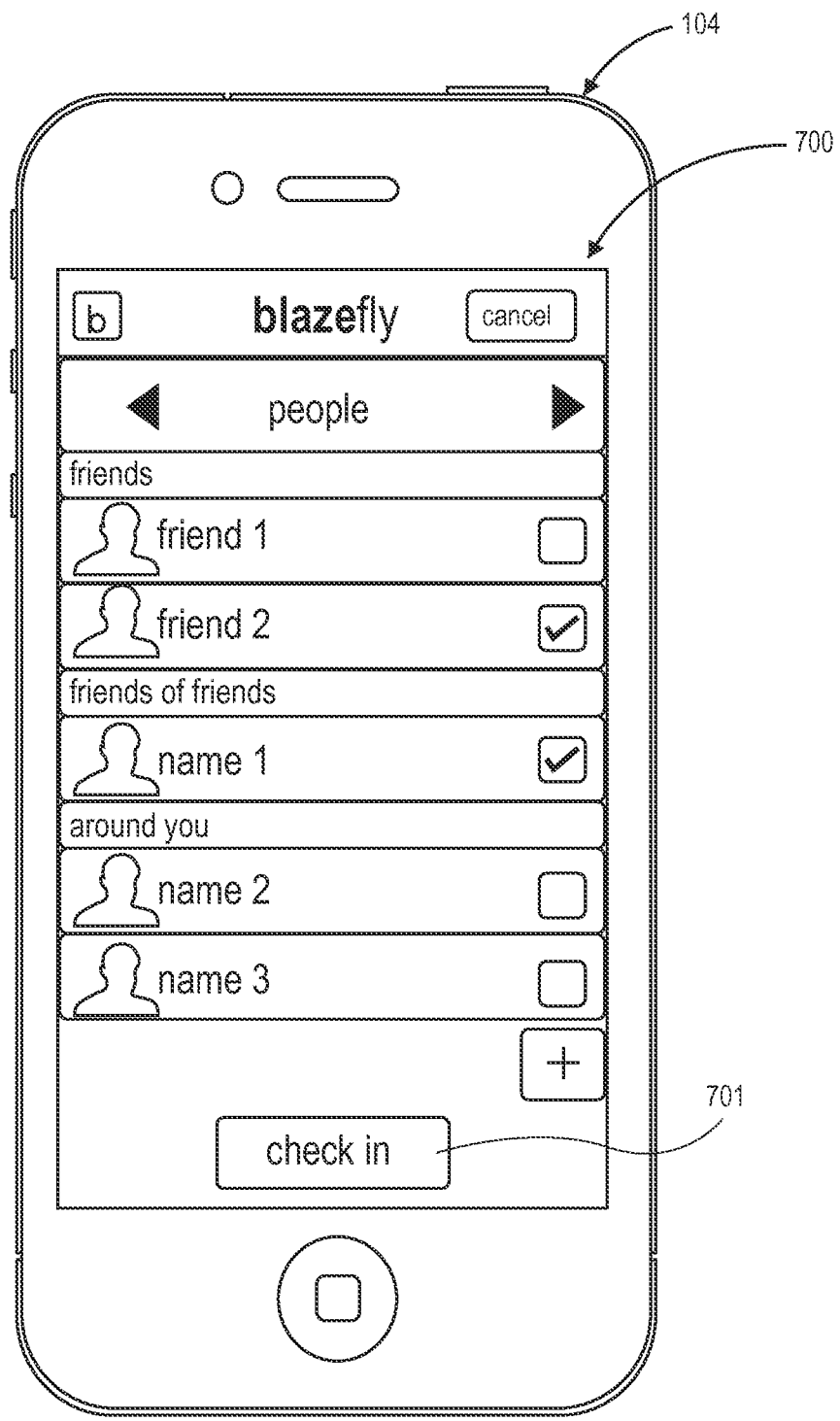
Figure 7D:
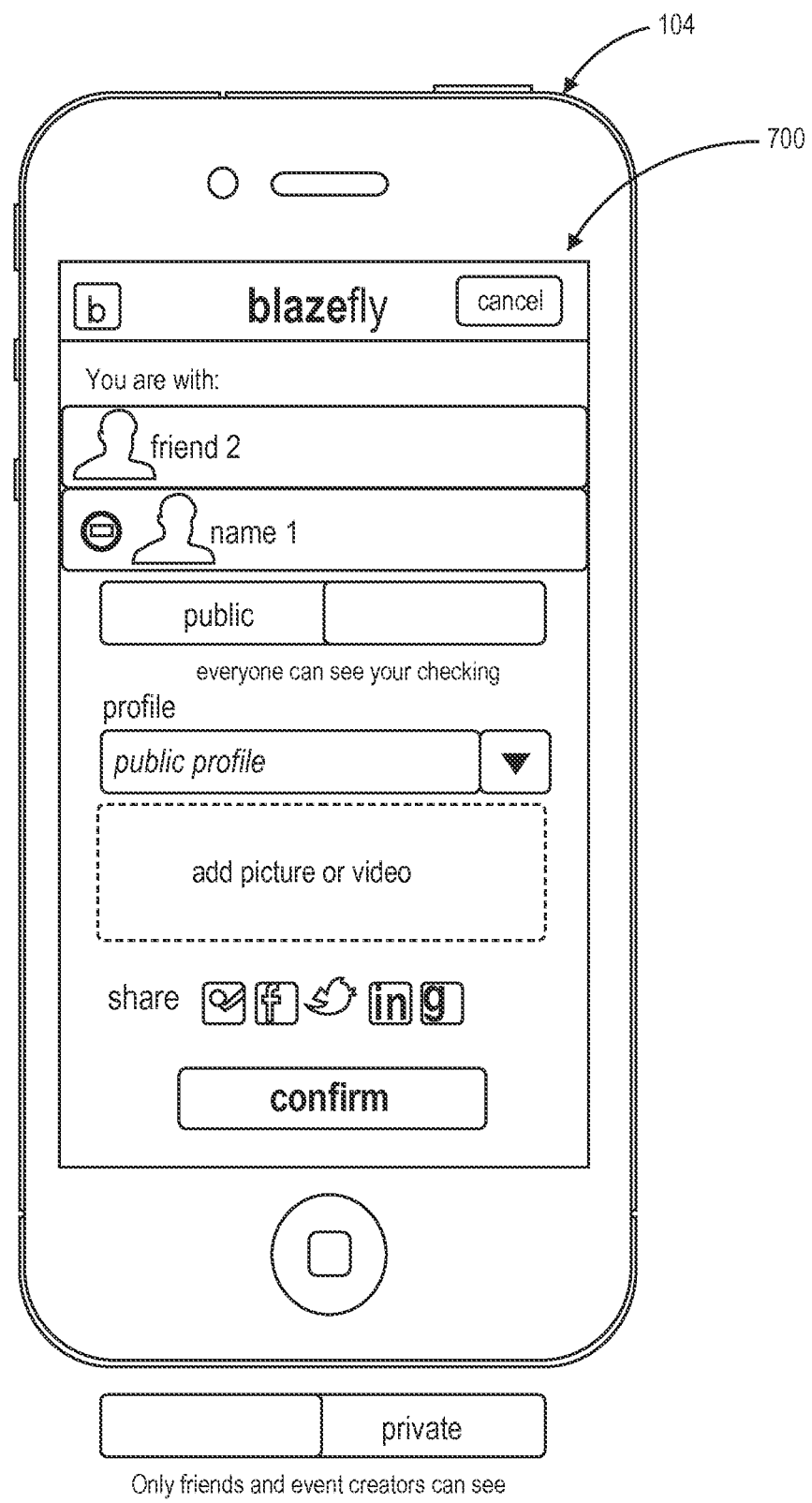
Figure 7E:
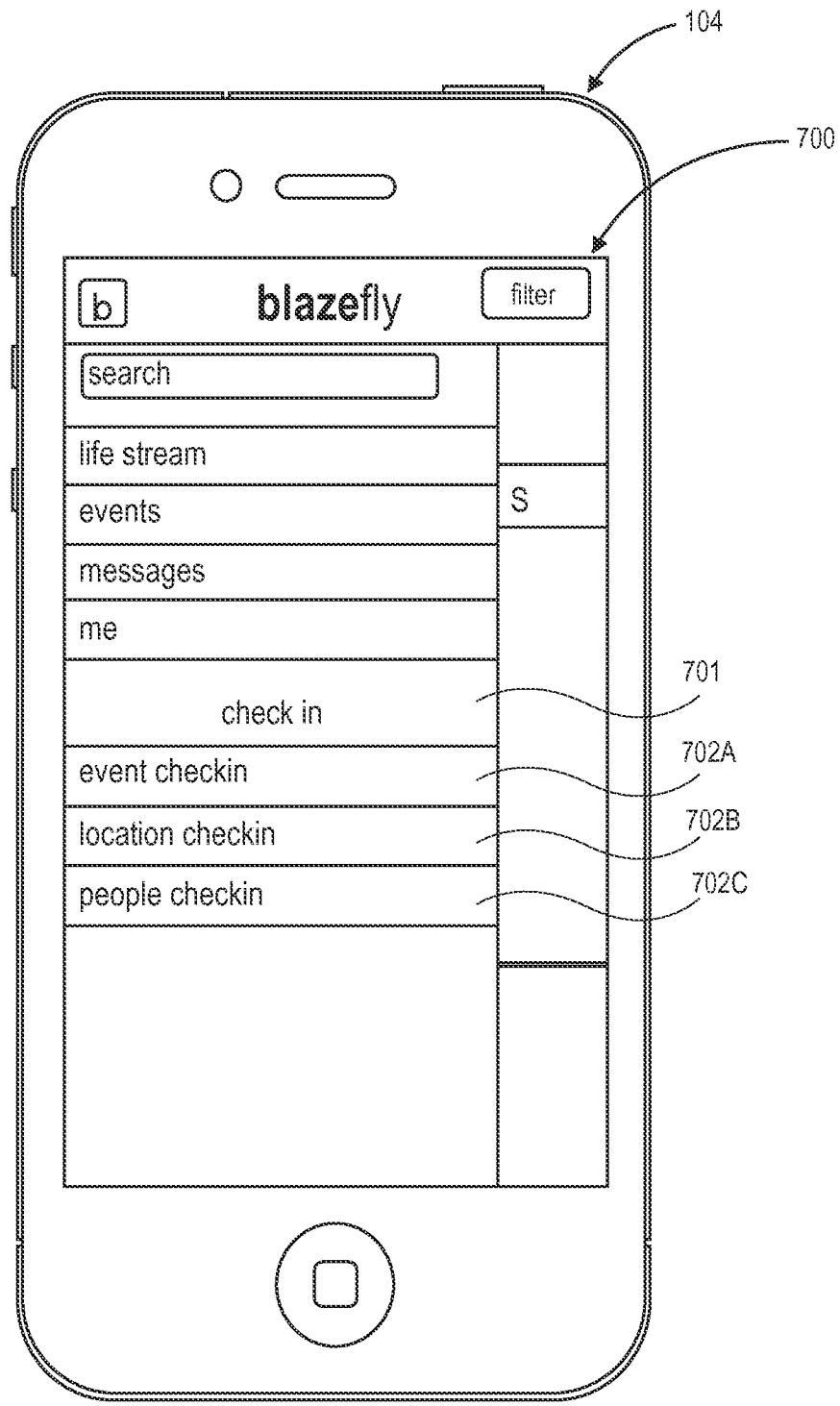
Figure 7F:
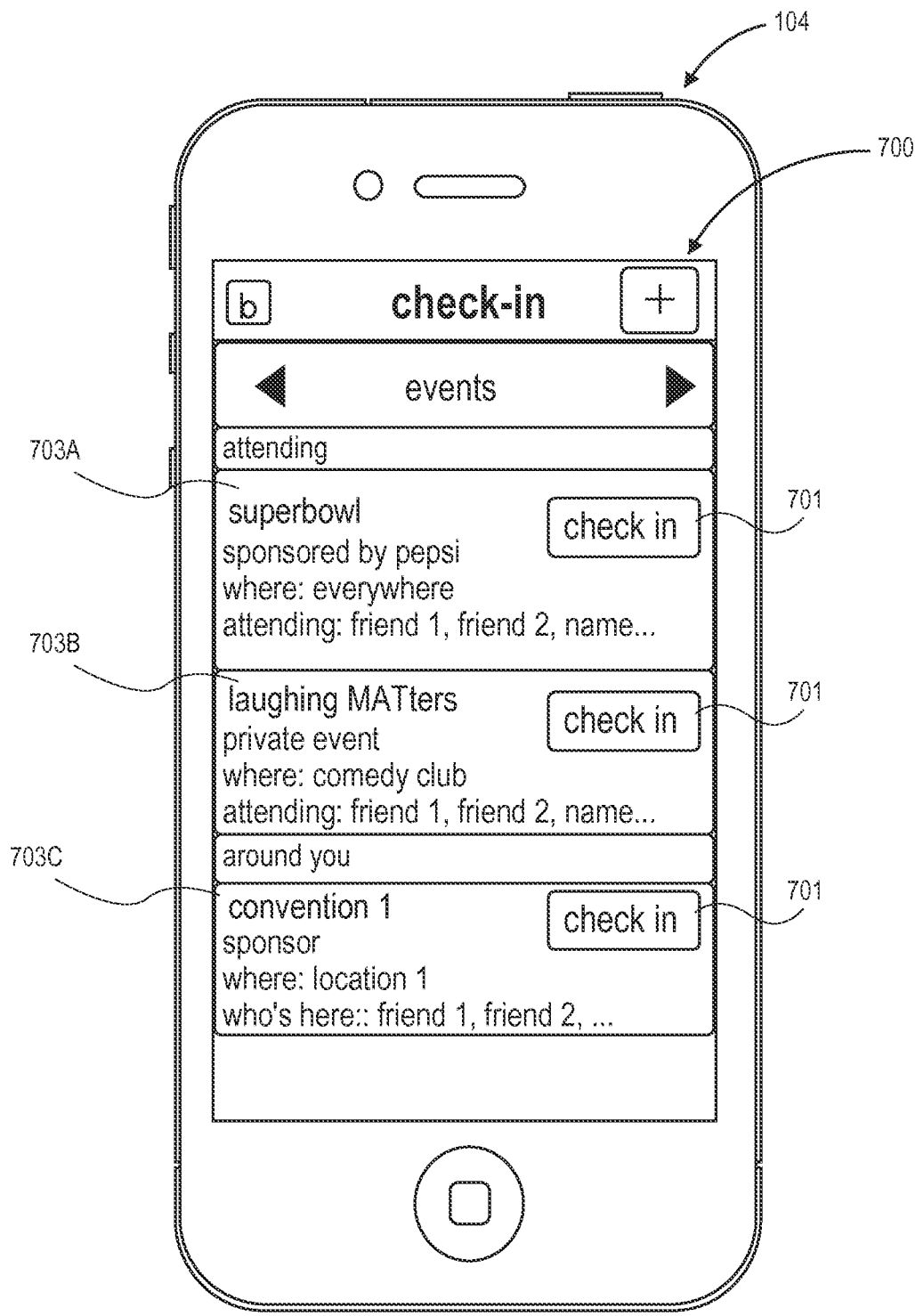
Figure 7G:
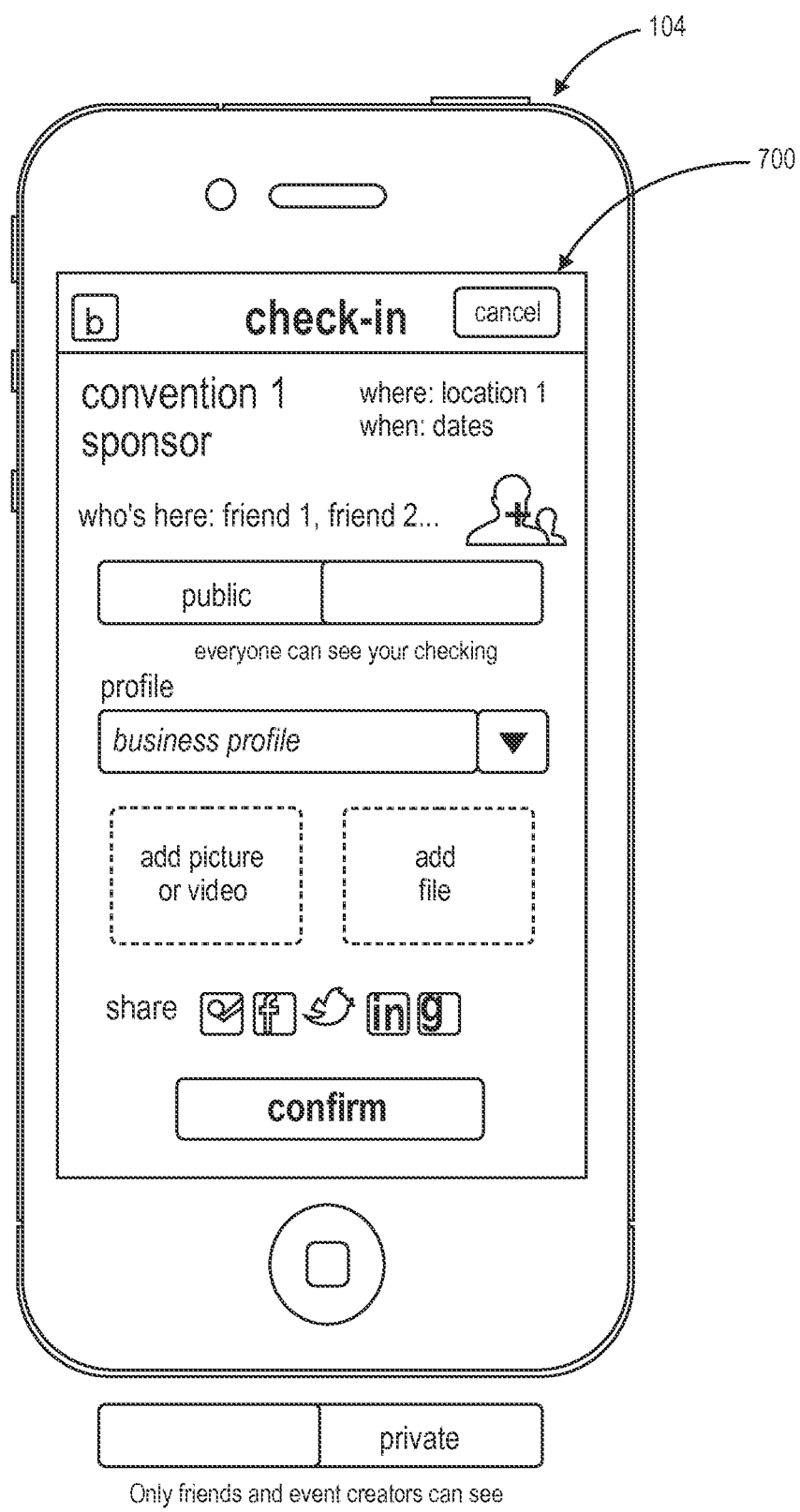
Figure 7H:
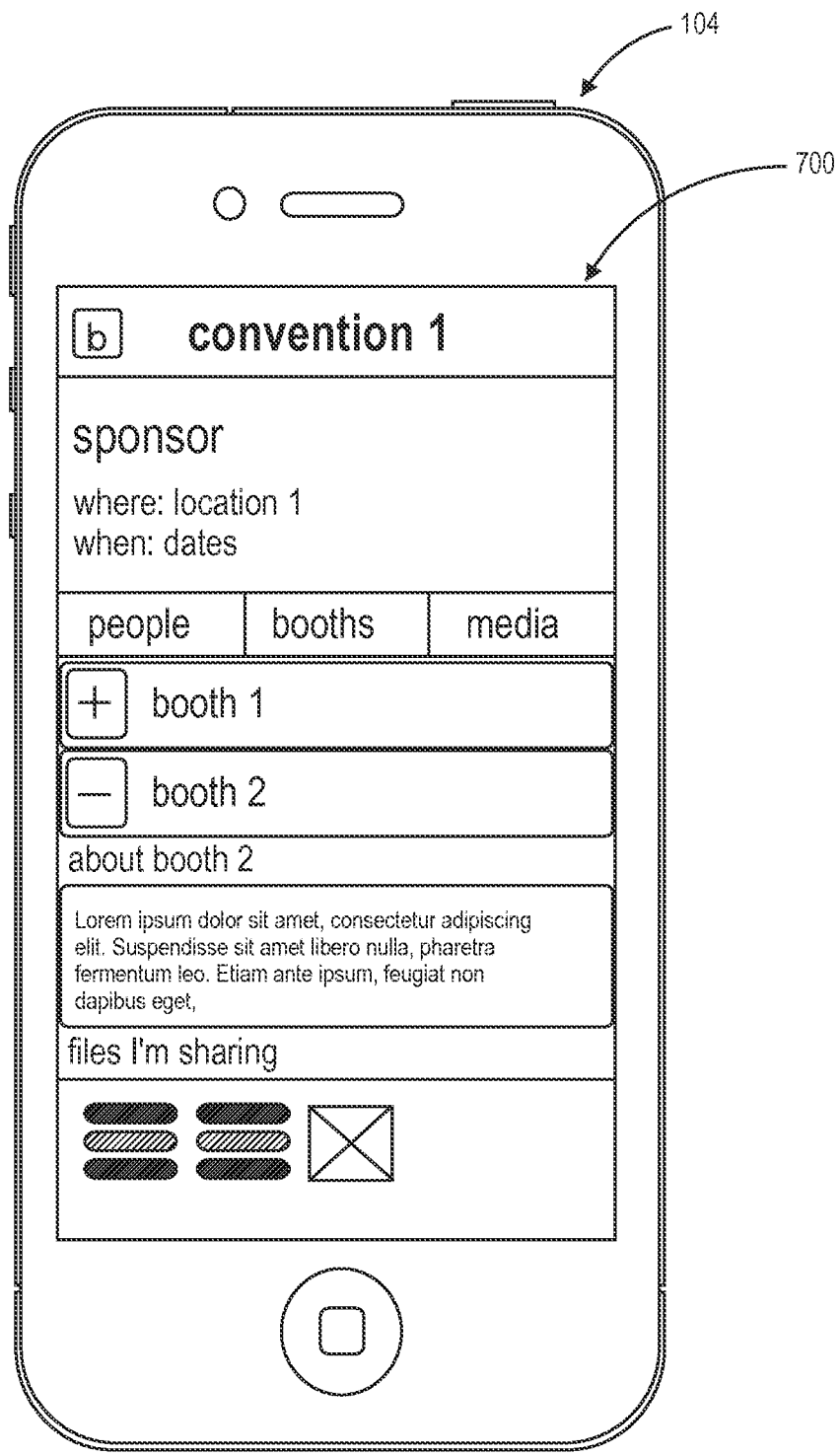

FIGS. 7A through 7K illustrate example screenshots in accordance with example implementations of the present disclosure. For example, FIGS. 7A through 7H illustrate example check-in screenshots 700 for checking into an event. The check-in graphic 701 causes the processor 118 to initiate the check-in module 150. As shown in FIGS. 7A and 7B, the user may be presented with graphics 702A, 702B, 702C to cause the module 150 to check-in to an event (i.e., a planned occasion), a location, or to people, respectively. The screenshot 700 shown in FIG. 7F illustrates that the user can check into one or more events. In an implementation, the screenshot 700 also conveys other users that are checked into the event as illustrated in graphics 703A, 703B, 703C. In an implementation, the users may comprise users that the current user has preexisting relationships with.

Figure 7I:
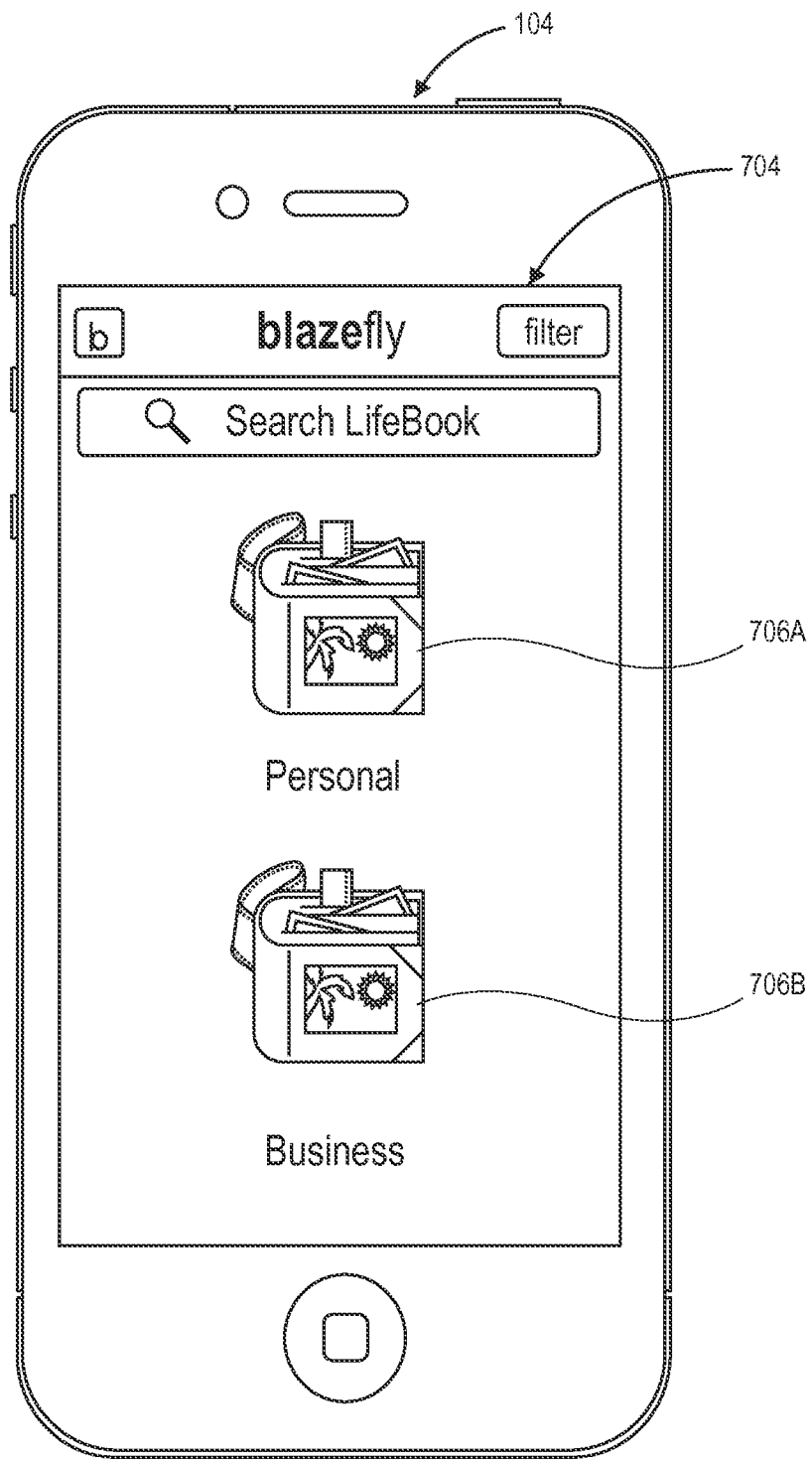
Figure 7J:
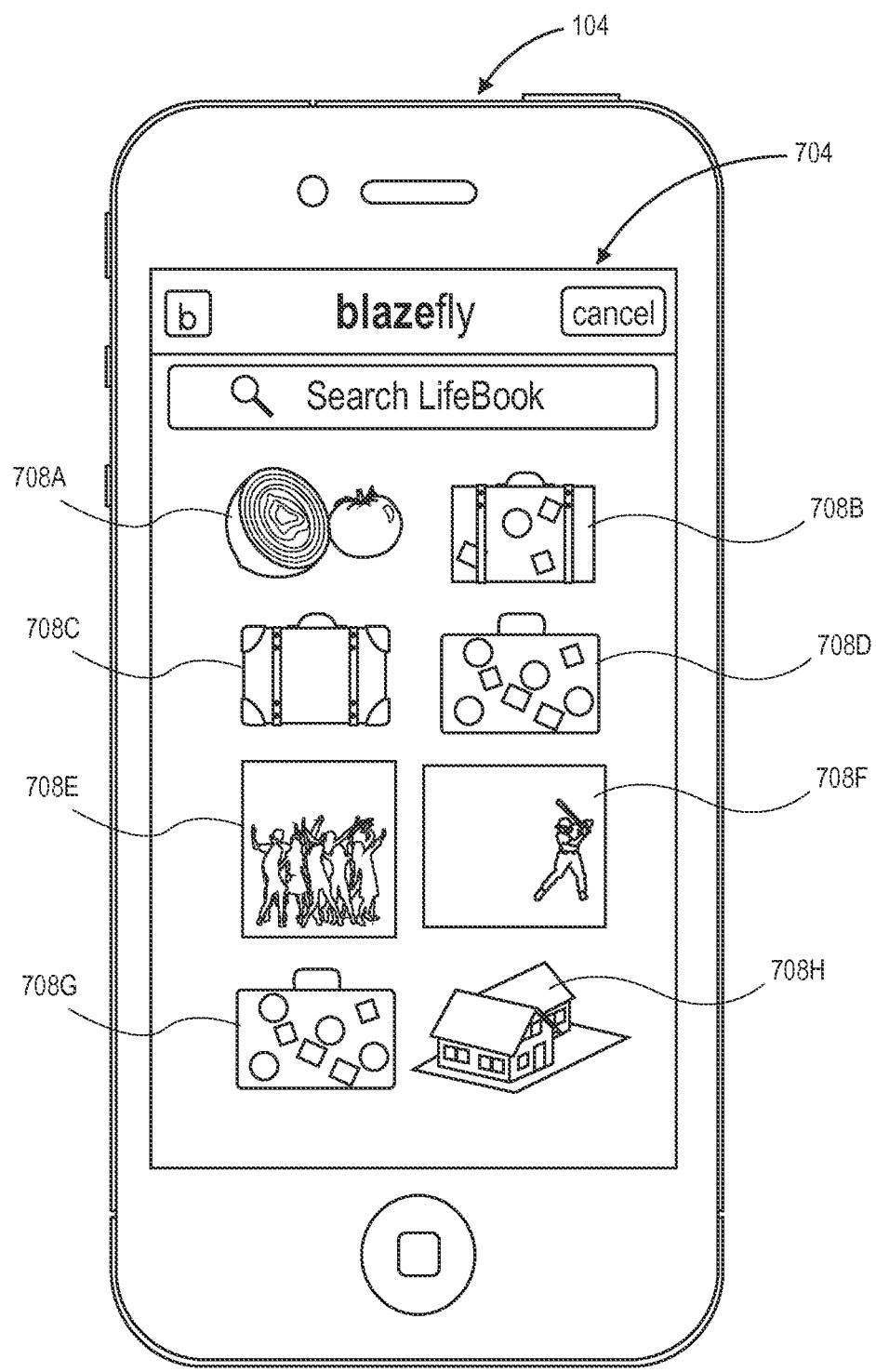
Figure 7K:
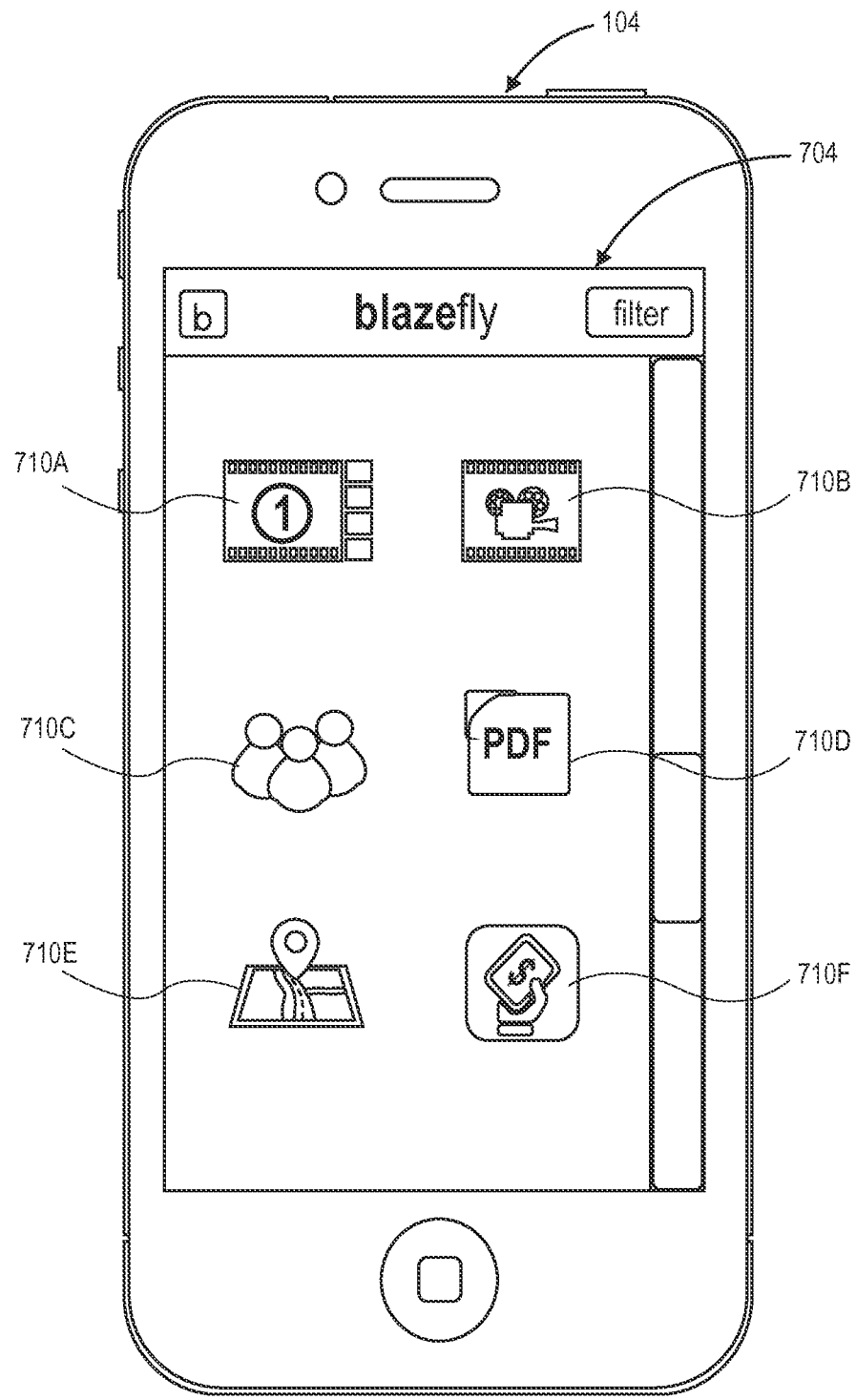

FIGS. 7I through 7K illustrate example screenshots 704 including folder graphical representations 706A, 706B once a user has checked into an event. For instance, folder graphics 706A represents a personal folder that furnishes access to content 110 defined as personal based upon a user check-in, and folder graphics 706B represents a business folder that furnishes access to content defined as business based upon the user check-in. FIG. 7J illustrates other example folder graphics 708A through 708H. These graphics 708A through 708H may represent interfaces to content 110 defined by one or more tags 112. For instance, folder graphic 708A may represent an interface to content 110 defined as food-related; folder graphics 708B, 708C, 708D, 708G may represent discrete interfaces to content 110 defined as travel-related (i.e., business trips, family trips, etc.); folder graphic 708E may represent an interface to content 110 defined as social-related; folder graphic 708F may represent an interface to content 110 defined as sports-related; and folder graphic 708H may represent an interface to content 110 defined as home-related. FIG. 7K illustrates a screenshot 704 including other folder graphics 710A through 710F that may represent an interface to content 110 defined as movie-related, friends-related, document-related, map-related, and financially-related.

In some implementations, the check-in module 150 may interface with a location-based social networking service API (e.g., FOURSQUARE, GOOGLE LATITUDE, FACEBOOK, GOWALLA, etc.) to define a relationship. For example, the check-in module 150 may be configured to interface with the location-determining module 128 to determine an approximate location of the mobile electronic device 104. Based upon the determined location, the approximate location of the device 104 is furnished to the location-based social networking service to cross-reference with various locations within the approximate location of the device 104. For example, the location-based social networking service may furnish a number of potential locations to the device 104 to allow the user to select the user's location. In another implementation, the check-in module 150 may also be configured to, with the approximate location of the device 104 determined by the location-determining module 128, interface with a server (e.g., server 102, third-party server, etc.) having a database therein allowing the user to select from a pre-defined set of locations and/or events (e.g., allow user to check-in to the location and/or event) proximate to the device's 104 approximate location. In another implementation, the module 150 may provide for a virtual check-in. For example, the module 150 may allow the user to check-in to an event online. For instance, the device 104 may present the ability to the user to check-in to a hotel once the device 104 is within a predetermined range of the hotel. Thus, the user may be presented (e.g., server 102 furnishes a push notification) with the ability to check-in to the hotel via the check-in module 150. Once the user has checked into the hotel, the user may be presented with a unique identifier that provides access to the user's hotel room and to bypass the hotel's front desk entirely. The user's check-in data may represent one or more behaviors associated with the user (e.g., the user's tastes, the user's likes, the user's preferences, etc.). This data may be collected by the server 102 and stored in memory 120 for future use.

Once the user defines a relationship regarding an event, or checks into the event, the module 150 is configured to cause the processor 118 to initiate one or more subroutines defined by the content metadata addition module 145. For example, once the user defines the relationship, the module 145 can associate (e.g., include and/or generate) tags 112 that define the relationship with content 110 generated and/or accessible to the mobile electronic device 104 based upon the data furnished by the check-in module 150. Once the tag 112 is associated with the content 110, the content 110 can be uploaded to the server 102. When the server 102 receives the content 110, the folder creation module 148 is configured to cause the processor 116 to organize the content 110 into one or more folders 108 based upon the relationship defined by the content's 110 tags 112. In an implementation, the module 148 organizes the content 110 into a folder 108 based upon the relationship defined by the tag 112. In another implementation, the module 148 organizes the content 110 into a folder 108 based upon the date the content 110 was created. In another implementation, the module 148 organizes the content 110 into a folder 108 based upon the people the user checked in with. In this implementation, the user and the person (or persons) the user checked in with may exchange each other's information (e.g., business contact information, e-mail, etc.). For example, a user may meet another individual at a conference and wish to exchange contact information with that individual. Thus, as shown in FIG. 2B, the user may initiate the check-in module 150 to cause the exchange of the user's contact information (e.g., "bumping phones together"), which was stored in memory 120 of the server 102 or in memory 122 of the device 104, with the individual, and vice versa (e.g., data representing the user's contact information is furnished to the individual's device 104, and vice versa). For example, the check-in module 150 may be configured to automatically cause the exchange of contact information between one or more other individuals when the user checks in with the one or more other individuals.

In another implementation, the folder creation module 148 is configured to automatically create one or more folders 108 in response to a user utilizing the check-in module 150 to check-in to an event (e.g., user checks into a person (e.g., a digital profile 162 of a person), a group of people (e.g., two or more digital profiles 162 associated with a respective person), a place, an event, a brand, a business, a concert, a restaurant, etc.). For instance, upon the user checking in via the module 150, the device 104 furnishes an instruction to cause the folder creation module 148 to cause the automatic creation of one or more folders 108 in response to the check-in. The folders 108 correspond to, or are associated with, a digital profile 162 (e.g., an account) of the user. As shown in FIG. 1, a user profile 162 may be stored in the server 102 and the mobile electronic device 104. It is understood that the user profile 162 stored on the server 102 may comprise multiple discrete user profiles that are each associated with a user of the system 100 and that the user profile 162 stored on the mobile electronic device 104 may comprise one or more profiles associated with a user (or users) of the mobile electronic device 104. Each check-in may cause the creation of a folder 108 corresponding to the particular event and to the user profile 162 of the user. In this implementation, the automatically created folders 108 include one or more tags 112 that define the folders 108. The tags 112 may be automatically generated when the folders 108 are created. Thus, the user may later upload content 110 generated during the event (e.g., digital photos from Prom 2012, video from Prom 2012, etc.). It is contemplated that the folders 108 may be shared between one or more other individuals (e.g., other individuals are provided access to the folders 108). For instance, friends of the user defined within a social networking context (e.g., FACEBOOK friends, etc.) may be provided access to the folders 108 to view the content 110 uploaded to the folders 108 or upload their own content 110 to the automatically created folders 108. In another instance, other individuals that checked into the same event may be provided access via the individual's mobile device 104 to upload content 110 generated by those individuals. Thus, the newly uploaded content 110 may be shared between (e.g., accessed) by other individuals that are provided access to the folders 108.

The exchanged data representing the content information may be stored within a respective customer relationship management module 152 (153), which is storable in memory 120, 122 and executable by the processors 116, 118. The customer relationship management module 152 (153) is representative of functionality to convey the user specified contact information in response to one or more queries by the user.

As shown in FIG. 1, the server 102 includes a gamification module 154, which is storable in memory 120 and executable by the processor 116. The gamification module 154 is representative of gamification functionality to enhance non-game contexts (e.g., encourage users to check-in frequently, etc.). For example, the gamification module 154 may cause the processor 116 to instruct the processor 118 to initiate display of a badge upon a predetermined number of check-ins with a particular event (e.g., a person, a business, a brand, etc.). In another example, the gamification module 154 may cause the processor 116 to initiate dispersing of a coupon to the user upon the user checking into a brand or business a predetermined number of times. In an implementation, each gamification item (e.g., coupons, badges, awards, etc.) may be stored in memory 120 and associated with a user's profile 162. It is understood that other examples are possible.

It is contemplated that a search engine may be employed, such as a search engine 156 within the server 102, that is configured to cause the processor 118 to initiate display of results in response to a user's query. For example, a user may wish to provide a query relating to a specified relationship via the mobile electronic device 104. The user may provide the query through an application, such as a web browser, or the like. The query is furnished to the search engine 156. In response, the search engine 156 is configured to search an index associated with the search engine 156 to determine content 110 that is to be furnished in a result based listing of content that best fits the user's query. For example, the search engine 156 is configured to search an index, which include the tags 112, to determine which tags 112 best fit the user's query. Thus, the user can define a contextual relationship query to retrieve content 110 having tags 112 occurring within the contextual relationship query. For example, the user may enter the query "Jimmy Buffett Concert 2011," and the search engine 156 is configured to return results that include content 110 having tags 112 defining a relationship associated with the "Jimmy Buffett Concert 2011" event. It is understood that other examples are possible.

As shown in FIG. 1, the device 104 further includes a mobile payment module 158, which is storable in the memory 122 and executable by the processor 118. The mobile payment module 158 furnishes mobile payment functionality to the device 104 once the user has checked into an event. For example, the user may check into a football game utilizing the check-in module 150. Once the user checks into the event (e.g., the football game), the user may initiate an electronic transaction to purchase concessions. In an implementation, once the user may check into the event with the user's seat assignment. Thus, the folder creation module 148 is configured to receive the user's seat assignment information and furnish this information to the vendor. This information may be provided by the module 148 upon receiving an indication the user is initiating an electronic transaction to purchase concessions.

The server 102 also includes a web content module 160, which is storable in the memory 120 and executable by the processor 116. In one or more implementations, the module 160 may be configured to present web (e.g., Internet) content (i.e., video, audio, news, etc.) to one or more users based upon a user's check-in history. For example, the user may check-in to a television show. Based upon one or more characteristics (e.g., theme of the show, how long the show is, characters within the show, actors/actresses within the show, etc.) and/or a context (other people that checked into the show, where the check-in occurred, what time the check-in occurred, etc.) of the television show, the module 160 is configured to present other television shows at least partially related to the characteristics and/or context of the television show the user checked into. However, it is understood that the module 160 is also configured to present other web content, such as audio, or news articles, based upon the characteristics and/or context of the television show. Thus, the server 102 is configured to furnish web content to a user tailored to, or based upon the, a user's check-in behavior.

The module 160 may also be configured to allow a user to license web content from a third party for utilization on another web site utilized by the user. For example, the user may wish to receive a copyright license to allow the reproduction of web content on a web site owned and/or operated by the user. Thus, the module 160 may allow for a user, upon check-in to the desired content, to agree to a copyright license for the desired content.

In one or more implementations of the present disclosure, the data collected by the server 102 may be utilized to furnish contextual and behavioral statistics to one or more entities. For example, the check-in data may be utilized by one or more entities for determining how many people checked into an event. For instance, the check-in data may be utilized to determine how many people checked-in to view a television program, where the people checked-in to view the television program, and how long the people checked-in to view the television program. Thus, the check-in data may be utilized to increase retention of one or more people or to garner other contextual/behavioral data.

Figure 4:
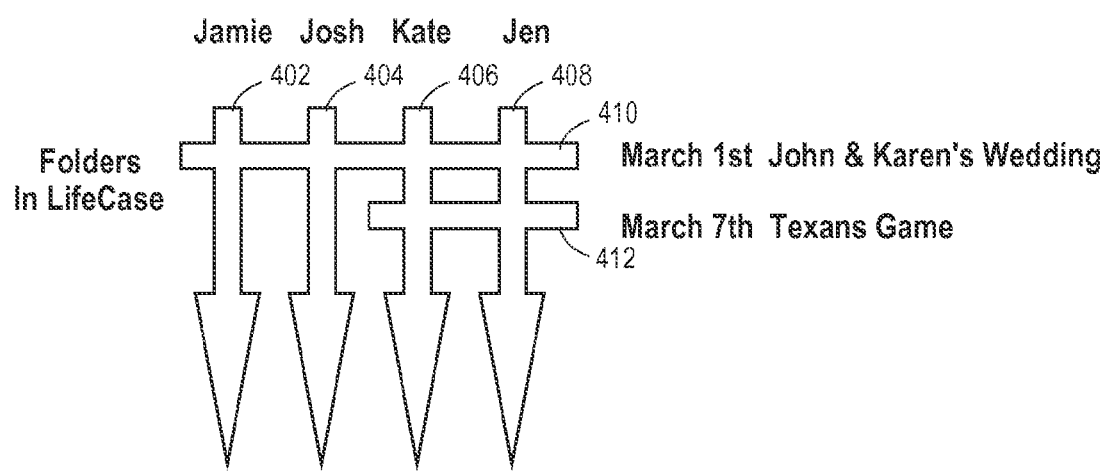
FIG. 4 is a conceptual illustration of a defined relationship based upon a check-in into multiple events.

In some respects, the relationship comprises a horizontal relationship with other users based upon user check-ins, as shown in FIG. 4. In other words, a user check-in may define a horizontal relationship with another user that has checked into the same event. As shown in FIG. 4, each vertical arrow 402, 404, 406, 408 represents a timeline of four users, Jamie, Josh, Kate, and Jen, respectively. The horizontal arrows 410, 412 that partially overlap one or more of vertical timelines 402, 404, 406, 408 represent check-ins at events by a respective user. For example, the horizontal arrow 410 represents that Jaime, Josh, Kate, and Jen each checked into John and Karen's wedding. Based on the check-in to John and Karen's wedding, Jaime, Josh, Kate, and Jen may be able to share content 110 generated at the wedding with one another. In another example, the horizontal arrow 412 represents that Kate and Jen each checked into the Texans game. Based upon the check-in to Texans game, Kate and Jen may be able to share content 110 generated at the Texans game with one another.

Generally, any of the functions described herein can be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the modules represent executable instructions that perform specified tasks when executed on a processor, such as the processors 116 and 118 of the server 102 and mobile electronic device 104, respectively, of FIG. 1. The program code can be stored in one or more computer readable media, an example of which is the memory 120 and 122 of the server 102 and mobile electronic device 104, respectively, of FIG. 1.

Example Method

Figure 5:
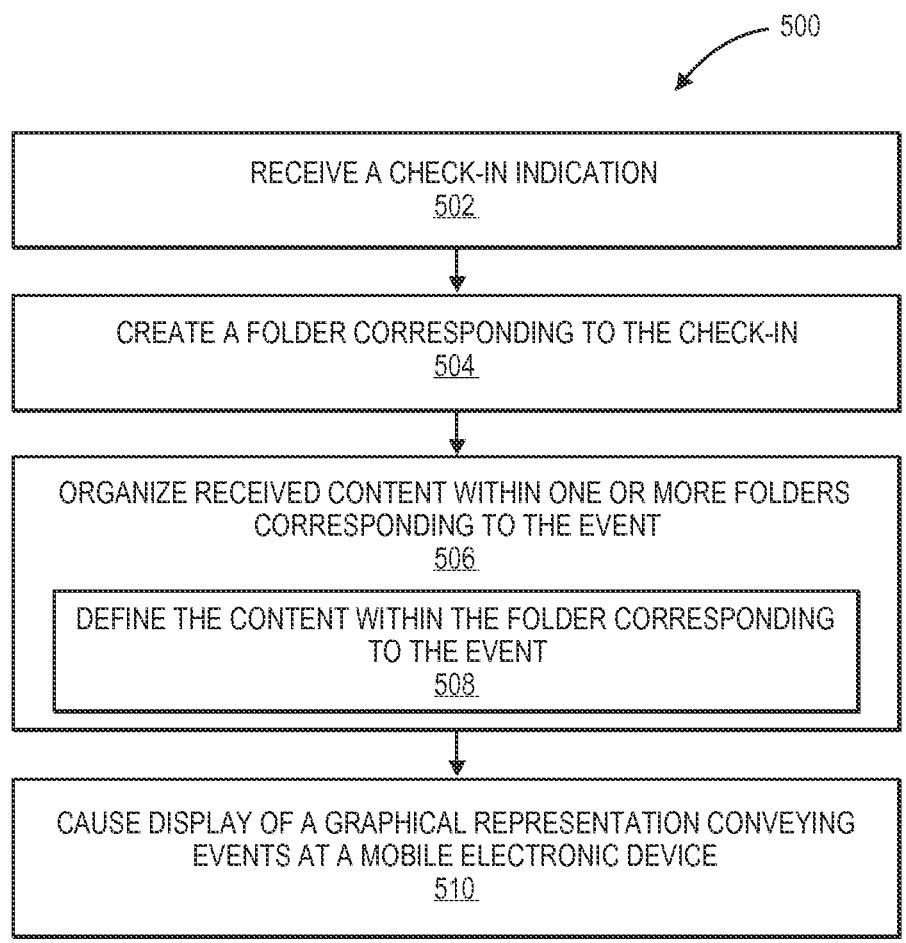
FIG. 5 is a flow diagram illustrating an example method for automatically generating at least one folder in response to receiving a check-in indication related to an event.

FIG. 5 illustrates an example method 500 for automatically checking into an event in accordance with an example implementation of the present disclosure. As shown, a check-in indication is received (Block 502). As described above, a user may utilize the mobile electronic device 104 to check-in to an event (e.g., user checks into a person (e.g., a digital profile 162 of a person), a group of people (e.g., two or more digital profiles 162 associated with a respective person), a place, an event, a brand, a business, a concert, a restaurant, etc.). In response to receiving a check-in indication, a folder corresponding to the check-in is created (Block 504). In one or more implementations, once a user checks into an event, a folder 108 corresponding to the user is generated. For example, this folder 108 may be associated with a digital profile 162 (e.g., an account) of the user. As shown in FIGS. 3A and 3B, a folder hierarchy may be created that corresponds to a specific event. In other words, a subset of folders be created for a single, discrete event (e.g., a folder based upon the location, a folder based upon the date, a folder based upon specific event, a folder based upon one or more of the checked-in users, etc.).

As shown in FIG. 5, received content is organized within one or more folders corresponding to the event (Block 506). In one or more implementations, the module 148 is configured to organize content 110 into a folder 108 based upon a relationship defined by the tag 112. The content 110 may be furnished to the server 102 from the mobile electronic device 104. For example, the content 110 may include, but is not limited to: videos, audio, status updates, news, or the like. As shown in FIG. 5, content received from the mobile electronic device is defined within the folder corresponding to the event (Block 508). The metadata content module 146 is configured to include tags 112 with the respective content 110. In an implementation, the tag 112 categorizes, or defines, the relationship of the content 110 with the event the user checks into. Thus, the module 146 is configured to define a relationship between the content 110 and the event based upon one or more tags 112.

Figure 6A:
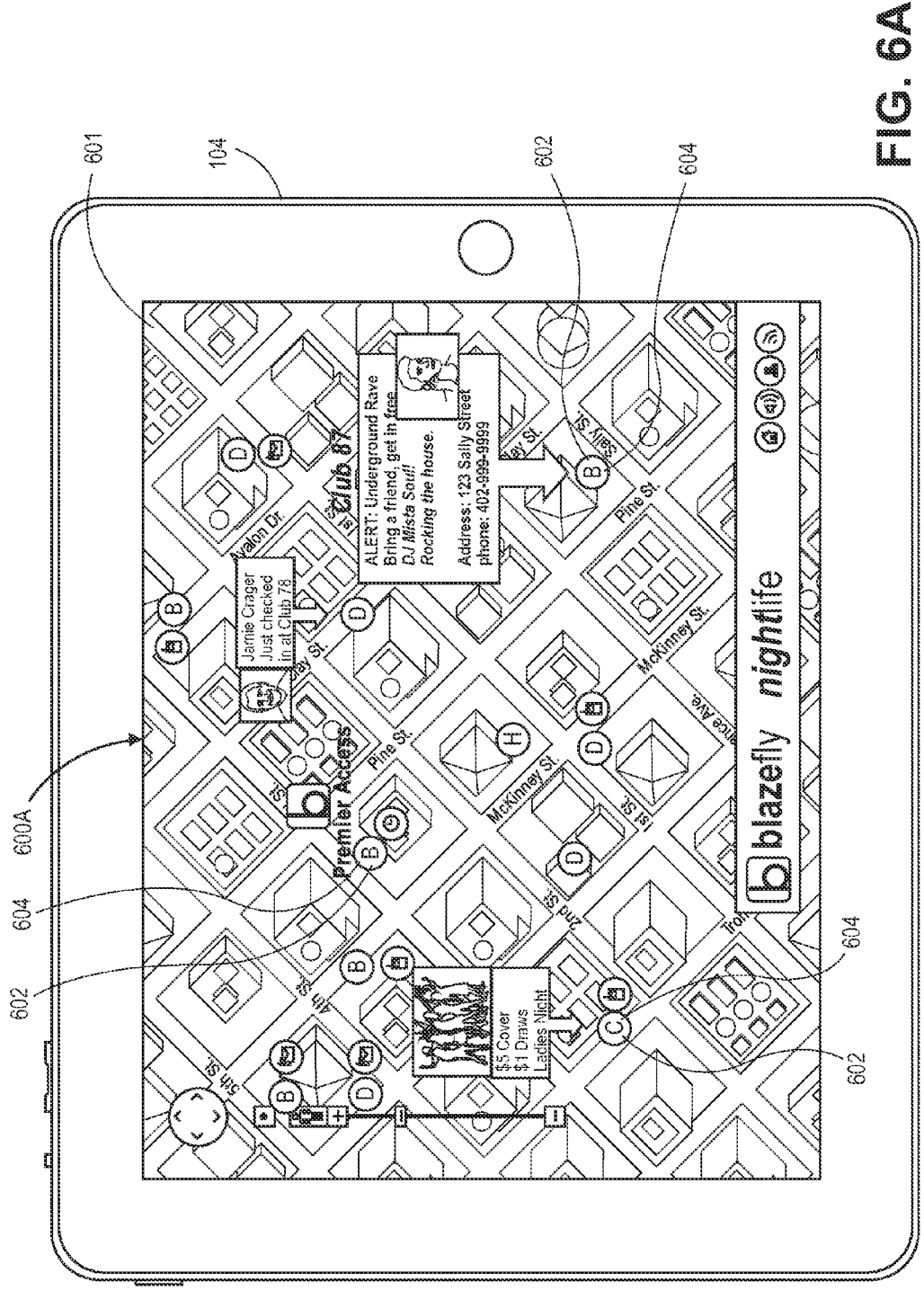
FIGS. 6A and 6B are graphical representations of example displays at an electronic device in accordance with an example implementation of the present disclosure, where graphical representations convey a map of an area of interest and the map includes map indicators of possible check-in events.
Figure 6B:
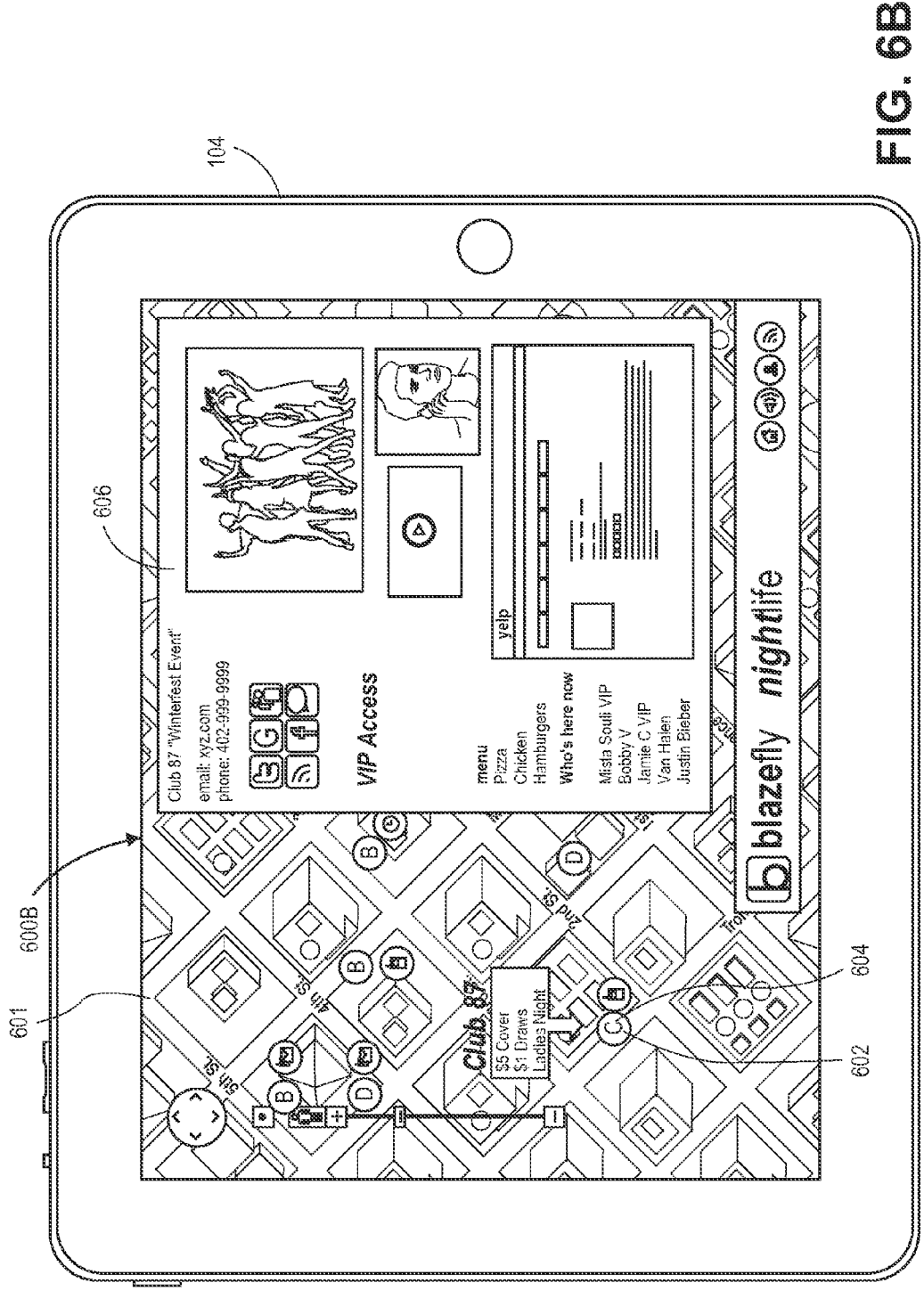

As shown in FIG. 5, a graphical representation conveying events is caused to be displayed at the mobile electronic device (Block 510). FIGS. 6A and 6B illustrate example displays 600A, 600B for conveying a graphical representation 601 of one or more events 602 that a user may check into. For example, the graphical representation 601 may comprise a graphic representing a map of locations proximate (e.g., within a block, within a mile, within five miles, etc.) to a location of interest to the user (e.g., locations proximate to a current location of the device 104, location proximate to a location that the user has input, etc.). The events 602 may be displayed within the graphic 600 as map indicators (i.e., markers) 604 that convey a proximate location of the event 602. In one or more implementations, the module 151 is configured to determine the potential events 602. For example, the module 151 may determine that the event 602 is a of potential interest based upon, but not limited: previous check-ins, such as previous check-ins at related events (e.g., similar food options, similar entertainment options, etc.); other user check-ins (e.g., users that you have a predefined relationship with, such as a relationship through one or more social media networking services); and so forth. In some implementations, as shown in FIG. 6B, the graphic 600 may include a graphic 606 that conveys information relating to a selected event 602. The graphic 606 may include information conveying menu options, entertainment options, other users that have checked into the selected event, social media directory service information, content related to the selected event (e.g., images, video, audio, etc.), and the like.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A server comprising:
a memory storing one or more modules; and
a processor coupled to the memory, the processor executing the one or more modules to:
receive a first check-in indication from a first mobile electronic device, the first check-in indication defining a relationship corresponding to a first event based upon at least one first event metadata tag;
automatically create a first folder in response to receiving the first check-in indication corresponding to the first event, wherein first event digital content corresponding to the first event based upon the relationship is organized in the first folder, the first folder stored in the memory;
receive the first event digital content from the first mobile electronic device, the first event digital content including the at least one first event metadata tag defining the relationship of the first event digital content to the first event, the at least one first event metadata tag including first location data corresponding to the first event generated by a location-determining component of the first mobile electronic device;
associate the first event digital content with the first event folder based upon the at least one first event metadata tag;
receive a second check-in indication corresponding to the first event from a second mobile electronic device;
provide near real-time access to the first event digital content associated with the first folder, wherein access is provided to a plurality of mobile electronic devices, including the first mobile electronic device and the second mobile electronic device, based upon respective check-in indications corresponding to the first event;
generate a check-in stream comprising check-in related information at a user interface of the second mobile electronic device, the check-in stream providing access to the first event digital content associated with the first folder;
receive a third check-in indication from the second mobile electronic device, the third check-in indication defining a relationship corresponding to a second event based upon at least one second event metadata tag;
automatically create a second folder in response to receiving the third check-in indication corresponding to the second event, wherein second event digital content corresponding to the second event based upon the relationship is organized in the second folder, the second folder stored in the memory;
receive the second event digital content from the second mobile electronic device, the digital content including at least one second event metadata tag defining the relationship of the second event digital content to the second event, the at least one second event metadata tag including second location data corresponding to the second event generated by a location-determining component of the second mobile electronic device;
associate the second event digital content with the second folder based upon the at least one second event metadata tag;
receive a fourth check-in indication corresponding to the second event from a third mobile electronic device;
provide near real-time access to the second event digital content associated with the second folder, wherein access is provided to a plurality of mobile electronic devices, including the second mobile electronic device and the third mobile electronic device, based upon respective check-in indications corresponding to the second event.

2. The server as recited in claim 1, wherein the event comprises at least one of a person, a location, a brand, a business, a business meeting, a conference, a planned public occasion, or a planned social occasion.

3. The server as recited in claim 1, wherein the processor executes the one or more modules to to receive the first event digital content generated by the second mobile electronic device; associate the first event digital content generated by the second mobile electronic device with the first folder based upon the relationship of the first event digital content to the first folder as defined by the at least one first event metadata tag; and provide near real-time access to the first event digital content generated by the second mobile electronic device associated with the first folder, wherein access is provided to the plurality of mobile electronic devices, including the first mobile electronic device and the second mobile electronic device, based upon respective check-in indications corresponding to the first event.

4. The server as recited in claim 1, wherein the processor executes the one or more modules to receive the second event digital content generated by the third mobile electronic device; associate the second event digital content generated by the third mobile electronic device with the second folder based upon the at least one second event metadata tag; and provide near real-time access to the second event digital content generated by the third mobile electronic device associated with the second folder, wherein access is provided to plurality of mobile electronic devices, including the second mobile electronic device and the third mobile electronic device, based upon respective check-in indications corresponding to the second event.

5. A computer-implemented method comprising:
receiving, by a processor, at a server, a first check-in indication from a first mobile electronic device, the first check-in indication defining a relationship corresponding to a first event based upon at least one first event metadata tag, the at least one first event metadata tag including first location data corresponding to the first event generated by a location-determining component of the first mobile electronic device;
automatically, via a server-side sub-routine, creating a first folder in response to receiving the first check-in indication corresponding to the first event, wherein first event digital content corresponding to the first event based upon the relationship is organized in the first folder, the first folder stored in the memory;
receiving the first event digital content from the first mobile electronic device, the first event digital content including the at least one first event metadata tag for defining the relationship of the first event digital content to the first event;
associating, via the server-side sub-routine, the first event digital content with the first event folder based upon the at least one first event metadata tag;
receiving a second check-in indication corresponding to the first event from a second mobile electronic device;
providing near real-time access to the first event digital content associated with the first folder, wherein access is provided to a plurality of mobile electronic devices, including the first mobile electronic device and the second mobile electronic device, based upon respective check-in indications corresponding to the first event, generating a check-in stream comprising check-in related information at a user interface of the second mobile electronic device, the check-in stream providing access to the first event digital content associated with the first folder;

receiving a third check-in indication from the second mobile electronic device, the third check-in indication defining a relationship corresponding to a second event based upon at least one second event metadata tag;

automatically creating, via the server-side sub-routine, a second folder in response to receiving the third check-in indication corresponding to the second event, wherein second event digital content corresponding to the second event based upon the relationship is organized in the second folder, the second folder stored in the memory;

receiving the second event digital content from the second mobile electronic device, the digital content including at least one second event metadata tag defining the relationship of the second event digital content to the second event, the at least one second event metadata tag including second location data corresponding to the second event generated by a location-determining component of the second mobile electronic device;

associating, via the server-side sub-routine, the second event digital content with the second folder based upon the at least one second event metadata tag;

receiving a fourth check-in indication corresponding to the second event from a third mobile electronic device;

providing near real-time access to the second event digital content associated with the second folder, wherein access is provided to a plurality of mobile electronic devices, including the second mobile electronic device and the third mobile electronic device, based upon respective check-in indications corresponding to the second event.

6. The computer-implemented method as recited in claim 5, further comprising causing display of a graphical representation of a map at a display of the first mobile electronic device, the map including map indicators to indicate events proximate to a predetermined location.

7. The computer implemented method as recited in claim 5, further comprising receiving the first event digital content generated by the second mobile electronic device; associating the first event digital content generated by the second mobile electronic device with the first folder based upon the relationship of the first event digital content to the first folder as defined by the at least one first event metadata tag; and providing near real-time access to the first event digital content generated by the second mobile electronic device associated with the first folder, wherein access is provided to the plurality of mobile electronic devices, including the second mobile electronic device and the third mobile electronic device, based upon respective check-in indications corresponding to the first event.

8. The computer-implemented method as recited in claim 5, further comprising receiving the second event digital content generated by the third mobile electronic device; associating the second event digital content generated by the third mobile electronic device with the second folder based upon the at least one second event metadata tag; and providing near real-time access to the second event digital content generated by the third mobile electronic device associated with the second folder, wherein access is provided to plurality of mobile electronic devices, including the second mobile electronic device and the third mobile electronic device, based upon respective check-in indications corresponding to the second event.

9. The computer-implemented method as recited in claim 5, wherein the event comprises at least one of a person, a location, a brand, a business, a business meeting, a conference, a planned public occasion, or a planned social occasion.

10. The computer-implemented method as recited in claim 5,
wherein the at least first event metadata tag further comprises time data to define a relationship with the first event based upon the time data.

11. A system comprising:
a plurality of mobile electronic devices;
a server coupled to the plurality of mobile electronic devices, the server comprising:
a memory storing one or more modules; and
a processor coupled to the memory, the processor executing the one or more modules to:
receive a first check-in indication from a first mobile electronic device of the plurality of mobile electronic devices, the first check-in indication defining a relationship corresponding to a first event based upon at least one first event metadata tag;

automatically create, via a server-side sub-routine, a first folder in response to receiving the first check-in indication corresponding to the first event, wherein first event digital content corresponding to the first event based upon the relationship is organized in the first folder, the first folder stored in the memory;

receive the first event digital content from the first mobile electronic device, the first event digital content including the at least one first event metadata tag defining the relationship of the first event digital content to the first event, the at least one first event metadata tag including first location data corresponding to the first event generated by a location-determining component of the first mobile electronic device and first time data corresponding to the first event;

associate the first event digital content with the first event folder based upon the at least one first event metadata tag;

receive a second check-in indication corresponding to the first event from a second mobile electronic device of the plurality of mobile electronic devices;

provide near real-time access to the first event digital content associated with the first folder, wherein access is provided to the plurality of mobile electronic devices, including the first mobile electronic device and the second mobile electronic device, based upon respective check-in indications corresponding to the first event;

generate a check-in stream comprising check-in related information at a user interface of the second mobile electronic device, the check-in stream providing access to the first event digital content associated with the first folder;

receive a third check-in indication from the second mobile electronic device, the third check-in indication defining a relationship corresponding to a second event based upon at least one second event metadata tag;

automatically create a second folder in response to receiving the third check-in indication corresponding to the second event, wherein second event digital content corresponding to the second event based upon the relationship is organized in the second folder, the second folder stored in the memory;

receive the second event digital content from the second mobile electronic device, the digital content including at least one second event metadata tag defining the relationship of the second event digital content to the second event, the at least one second event metadata tag including second location data corresponding to the second event generated by a location-determining component of the second mobile electronic device and second time data corresponding to the second event;

associate the second event digital content with the second folder based upon the at least one second event metadata tag;

receive a fourth check-in indication corresponding to the second event from a third mobile electronic device of the plurality of mobile electronic devices;

provide near real-time access to the second event digital content associated with the second folder, wherein access is provided to a plurality of mobile electronic devices, including the second mobile electronic device and the third mobile electronic device, based upon respective check-in indications corresponding to the second event.

12. The system as recited in claim 11, wherein the processor executes the one or more modules to receive the first event digital content generated by the second mobile electronic device; associate the first event digital content generated by the second mobile electronic device with the first folder based upon the relationship of the first event digital content to the first folder as defined by the at least one first event metadata tag; and provide near real-time access to the first event digital content generated by the second mobile electronic device associated with the first folder, wherein access is provided to the plurality of mobile electronic devices, including the first mobile electronic device and the second mobile electronic device, based upon respective check-in indications corresponding to the first event.

13. The system as recited in claim 11, wherein the processor executes the one or modules to receive the second event digital content generated by the third mobile electronic device; associate the second event digital content generated by the third mobile electronic device with the second folder based upon the at least one second event metadata tag; and provide near real-time access to the second event digital content generated by the third mobile electronic device associated with the second folder, wherein access is provided to plurality of mobile electronic devices, including the second mobile electronic device and the third mobile electronic device, based upon respective check-in indications corresponding to the second event.

\* \* \* \* \*